US008584307B2

(12) United States Patent
Won et al.

(10) Patent No.: US 8,584,307 B2
(45) Date of Patent: *Nov. 19, 2013

(54) MODULAR ROBOT

(75) Inventors: Chikyung Won, Tewksbury, MA (US);
Selma Svendsen, Andover, MA (US);
Paul E. Sandin, Brookline, NH (US);
Scott Thomas Burnett, Windham, NH (US); Deepak Ramesh Kapoor, Cranston, RI (US); Stephen A. Hickey, Somerville, MA (US); Robert Rizzari, Billerica, MA (US); Zivthan A. C. Dubrovsky, Waltham, MA (US)

(73) Assignee: iRobot Corporation, Bedord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,414

(22) Filed: Dec. 8, 2011

(65) Prior Publication Data
US 2012/0173064 A1    Jul. 5, 2012

Related U.S. Application Data

(63) Continuation of application No. 11/633,886, filed on Dec. 4, 2006.

(60) Provisional application No. 60/741,442, filed on Dec. 2, 2005.

(51) Int. Cl.
*A47L 5/00* (2006.01)

(52) U.S. Cl.
USPC .............................. 15/319; 15/340.1; 15/339

(58) Field of Classification Search
USPC .............. 15/319, 339, 340.1–340.3; 700/245; 701/23
IPC .............................. E01H 1/08; A47L 5/00,7/00
See application file for complete search history.

(56) References Cited

U.S. PATENT DOCUMENTS 1,755,054 A    4/1930    Darst
1,780,221 A    11/1930   Buchmann
(Continued)

FOREIGN PATENT DOCUMENTS

DE        19849978       2/2001
DE     102005046813 A1   4/2007
(Continued)

OTHER PUBLICATIONS

Andersen et al., "Landmark based navigation strategies", SPIE Conference on Mobile Robots XIII, SPIE vol. 3525, pp. 170-181, Jan. 8, 1999.

(Continued)

*Primary Examiner* — David Redding
(74) *Attorney, Agent, or Firm* — Fish & Richardson P.C.

(57) ABSTRACT

A coverage robot including a chassis, multiple drive wheel assemblies disposed on the chassis, and a cleaning assembly carried by the chassis. Each drive wheel assembly including a drive wheel assembly housing, a wheel rotatably coupled to the housing, and a wheel drive motor carried by the drive wheel assembly housing and operable to drive the wheel. The cleaning assembly including a cleaning assembly housing, a cleaning head rotatably coupled to the cleaning assembly housing, and a cleaning drive motor carried by cleaning assembly housing and operable to drive the cleaning head. The wheel assemblies and the cleaning assembly are each separately and independently removable from respective receptacles of the chassis as complete units.

16 Claims, 23 Drawing Sheets

(56) References Cited

U.S. PATENT DOCUMENTS

| | | |
|---|---|---|
| 1,970,302 A | 8/1934 | Gerhardt |
| 2,302,111 A | 11/1942 | Dow et al. |
| 3,166,138 A | 1/1965 | Dunn et al. |
| 3,457,575 A | 7/1969 | Bienek |
| 3,550,714 A | 12/1970 | Bellinger |
| 3,569,727 A | 3/1971 | Aggarwal et al. |
| 3,674,316 A | 7/1972 | De Brey |
| 3,696,727 A | 10/1972 | Yokozato |
| 3,756,667 A | 9/1973 | Bombardier et al. |
| 3,809,004 A | 5/1974 | Leonheart |
| 3,845,831 A | 11/1974 | James |
| RE28,268 E | 12/1974 | Autrand |
| 3,937,174 A | 2/1976 | Haaga |
| 4,004,313 A | 1/1977 | Capra |
| 4,119,900 A | 10/1978 | Kremnitz |
| D258,901 S | 4/1981 | Keyworth |
| 4,369,543 A | 1/1983 | Chen et al. |
| 4,465,370 A | 8/1984 | Yuasa et al. |
| 4,477,998 A | 10/1984 | You |
| 4,492,058 A | 1/1985 | Goldfarb et al. |
| 4,513,469 A | 4/1985 | Godfrey et al. |
| D278,732 S | 5/1985 | Ohkado |
| 4,618,213 A | 10/1986 | Chen |
| 4,674,047 A | 6/1987 | Tyler et al. |
| 4,679,152 A | 7/1987 | Perdue |
| 4,696,074 A | 9/1987 | Cavalli et al. |
| D292,223 S | 10/1987 | Trumbull |
| 4,700,427 A | 10/1987 | Knepper |
| D298,766 S | 11/1988 | Tanno et al. |
| 4,782,550 A | 11/1988 | Jacobs |
| 4,813,906 A | 3/1989 | Matsuyama et al. |
| 4,829,442 A | 5/1989 | Kadonoff et al. |
| 4,832,098 A | 5/1989 | Palinkas et al. |
| 4,851,661 A | 7/1989 | Everett |
| 4,854,000 A | 8/1989 | Takimoto |
| 4,884,506 A | 12/1989 | Guerreri |
| 4,919,224 A | 4/1990 | Shyu et al. |
| 4,919,489 A | 4/1990 | Kopsco |
| 4,920,605 A | 5/1990 | Takashima |
| 4,956,891 A | 9/1990 | Wulff |
| 4,971,591 A | 11/1990 | Raviv et al. |
| 4,974,283 A | 12/1990 | Holsten et al. |
| 5,001,635 A | 3/1991 | Yasutomi et al. |
| 5,022,812 A | 6/1991 | Coughlan et al. |
| D318,500 S | 7/1991 | Malewicki et al. |
| 5,033,291 A | 7/1991 | Podoloff et al. |
| 5,062,819 A | 11/1991 | Mallory |
| 5,070,567 A | 12/1991 | Holland |
| 5,090,321 A | 2/1992 | Abouav |
| 5,093,955 A | 3/1992 | Blehert et al. |
| 5,094,311 A | 3/1992 | Akeel |
| 5,144,715 A | 9/1992 | Matsuyo et al. |
| 5,152,028 A | 10/1992 | Hirano |
| 5,154,617 A | 10/1992 | Suman et al. |
| 5,165,064 A | 11/1992 | Mattaboni |
| 5,170,352 A | 12/1992 | McTamaney et al. |
| 5,182,833 A | 2/1993 | Yamaguchi et al. |
| 5,206,500 A | 4/1993 | Decker et al. |
| 5,233,682 A | 8/1993 | Abe et al. |
| 5,239,720 A | 8/1993 | Wood et al. |
| 5,251,358 A | 10/1993 | Moro et al. |
| 5,293,955 A | 3/1994 | Lee |
| D345,707 S | 4/1994 | Alister |
| 5,303,448 A | 4/1994 | Hennessey et al. |
| 5,309,592 A | 5/1994 | Hiratsuka |
| 5,310,379 A | 5/1994 | Hippely et al. |
| 5,319,828 A | 6/1994 | Waldhauser et al. |
| 5,321,614 A | 6/1994 | Ashworth |
| 5,324,948 A | 6/1994 | Dudar et al. |
| 5,363,935 A | 11/1994 | Schempf et al. |
| 5,369,347 A | 11/1994 | Yoo |
| 5,369,838 A | 12/1994 | Wood et al. |
| 5,400,244 A | 3/1995 | Watanabe et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,471,560 A | 11/1995 | Allard et al. |
| 5,497,529 A | 3/1996 | Boesi |
| 5,498,948 A | 3/1996 | Bruni et al. |
| 5,505,072 A | 4/1996 | Oreper |
| 5,511,147 A | 4/1996 | Abdel-Malek |
| 5,534,762 A | 7/1996 | Kim |
| 5,551,525 A | 9/1996 | Pack et al. |
| 5,555,587 A | 9/1996 | Guha |
| 5,560,077 A | 10/1996 | Crotchett |
| D375,592 S | 11/1996 | Ljunggren |
| 5,611,106 A | 3/1997 | Wulff |
| 5,611,108 A | 3/1997 | Knowlton et al. |
| 5,621,291 A | 4/1997 | Lee |
| 5,622,236 A | 4/1997 | Azumi et al. |
| 5,634,237 A | 6/1997 | Paranjpe |
| 5,636,402 A | 6/1997 | Kubo et al. |
| 5,647,554 A | 7/1997 | Ikegami et al. |
| 5,652,489 A | 7/1997 | Kawakami |
| 5,696,675 A | 12/1997 | Nakamura et al. |
| 5,714,119 A | 2/1998 | Kawagoe et al. |
| 5,717,484 A | 2/1998 | Hamaguchi et al. |
| 5,720,077 A | 2/1998 | Nakamura et al. |
| 5,735,959 A | 4/1998 | Kubo et al. |
| 5,752,871 A | 5/1998 | Tsuzuki |
| 5,756,904 A | 5/1998 | Oreper et al. |
| 5,761,762 A | 6/1998 | Kubo et al. |
| 5,764,888 A | 6/1998 | Bolan et al. |
| 5,767,437 A | 6/1998 | Rogers |
| 5,767,960 A | 6/1998 | Orman |
| 5,777,596 A | 7/1998 | Herbert |
| 5,778,486 A | 7/1998 | Kim |
| 5,781,697 A | 7/1998 | Jeong |
| 5,781,960 A | 7/1998 | Kilstrom et al. |
| 5,786,602 A | 7/1998 | Pryor et al. |
| 5,793,900 A | 8/1998 | Nourbakhsh et al. |
| 5,812,267 A | 9/1998 | Everett et al. |
| 5,814,808 A | 9/1998 | Takada et al. |
| 5,815,880 A | 10/1998 | Nakanishi |
| 5,815,884 A | 10/1998 | Imamura et al. |
| 5,819,008 A | 10/1998 | Asama et al. |
| 5,819,360 A | 10/1998 | Fujii |
| 5,819,936 A | 10/1998 | Saveliev et al. |
| 5,820,821 A | 10/1998 | Kawagoe et al. |
| 5,821,730 A | 10/1998 | Drapkin |
| 5,825,981 A | 10/1998 | Matsuda |
| 5,828,770 A | 10/1998 | Leis et al. |
| 5,831,597 A | 11/1998 | West et al. |
| 5,839,532 A | 11/1998 | Yoshiji et al. |
| 5,841,259 A | 11/1998 | Kim et al. |
| 5,869,910 A | 2/1999 | Colens |
| 5,896,611 A | 4/1999 | Haaga |
| 5,903,124 A | 5/1999 | Kawakami |
| 5,905,209 A | 5/1999 | Oreper |
| 5,907,886 A | 6/1999 | Buscher |
| 5,910,700 A | 6/1999 | Crotzer |
| 5,911,260 A | 6/1999 | Suzuki |
| 5,916,008 A | 6/1999 | Wong |
| 5,924,167 A | 7/1999 | Wright et al. |
| 5,926,909 A | 7/1999 | McGee |
| 5,933,102 A | 8/1999 | Miller et al. |
| 5,933,913 A | 8/1999 | Wright et al. |
| 5,935,179 A | 8/1999 | Kleiner et al. |
| 5,940,346 A | 8/1999 | Sadowsky et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,950,408 A | 9/1999 | Schaedler |
| 5,968,281 A | 10/1999 | Wright et al. |
| 5,974,348 A | 10/1999 | Rocks |
| 5,974,365 A | 10/1999 | Mitchell |
| 5,983,448 A | 11/1999 | Wright et al. |
| 5,984,880 A | 11/1999 | Lander et al. |

(56) References Cited

U.S. PATENT DOCUMENTS

| | | |
|---|---|---|
| 5,987,383 A | 11/1999 | Keller et al. |
| 5,989,700 A | 11/1999 | Krivopal |
| 5,991,951 A | 11/1999 | Kubo et al. |
| 5,995,883 A | 11/1999 | Nishikado |
| 5,996,167 A | 12/1999 | Close |
| 5,998,953 A | 12/1999 | Nakamura et al. |
| 5,998,971 A | 12/1999 | Corbridge |
| 6,000,088 A | 12/1999 | Wright et al. |
| 6,009,358 A | 12/1999 | Angott et al. |
| 6,021,545 A | 2/2000 | Delgado et al. |
| 6,023,813 A | 2/2000 | Thatcher et al. |
| 6,023,814 A | 2/2000 | Imamura |
| 6,025,687 A | 2/2000 | Himeda et al. |
| 6,026,539 A | 2/2000 | Mouw et al. |
| 6,030,464 A | 2/2000 | Azevedo |
| 6,030,465 A | 2/2000 | Marcussen et al. |
| 6,032,542 A | 3/2000 | Warnick et al. |
| 6,036,572 A | 3/2000 | Sze |
| 6,038,501 A | 3/2000 | Kawakami |
| 6,040,669 A | 3/2000 | Hog |
| 6,041,471 A | 3/2000 | Charky et al. |
| 6,041,472 A | 3/2000 | Kasen et al. |
| 6,046,800 A | 4/2000 | Ohtomo et al. |
| 6,049,620 A | 4/2000 | Dickinson et al. |
| 6,052,821 A | 4/2000 | Chouly et al. |
| 6,055,042 A | 4/2000 | Sarangapani |
| 6,055,702 A | 5/2000 | Imamura et al. |
| 6,061,868 A | 5/2000 | Moritsch et al. |
| 6,065,182 A | 5/2000 | Wright et al. |
| 6,073,432 A | 6/2000 | Schaedler |
| 6,076,025 A | 6/2000 | Ueno et al. |
| 6,076,026 A | 6/2000 | Jambhekar et al. |
| 6,076,226 A | 6/2000 | Reed |
| 6,076,227 A | 6/2000 | Schallig et al. |
| 6,081,257 A | 6/2000 | Zeller |
| 6,088,020 A | 7/2000 | Mor |
| 6,094,775 A | 8/2000 | Behmer |
| 6,099,091 A | 8/2000 | Campbell |
| 6,101,671 A | 8/2000 | Wright et al. |
| 6,108,031 A | 8/2000 | King et al. |
| 6,108,067 A | 8/2000 | Okamoto |
| 6,108,076 A | 8/2000 | Hanseder |
| 6,108,269 A | 8/2000 | Kabel |
| 6,108,597 A | 8/2000 | Kirchner et al. |
| 6,112,143 A | 8/2000 | Allen et al. |
| 6,112,996 A | 9/2000 | Matsuo |
| 6,119,057 A | 9/2000 | Kawagoe |
| 6,122,798 A | 9/2000 | Kobayashi et al. |
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,278 A | 11/2000 | Kobayashi |
| 6,154,279 A | 11/2000 | Thayer |
| 6,154,694 A | 11/2000 | Aoki et al. |
| 6,167,332 A | 12/2000 | Kurtzberg et al. |
| 6,167,587 B1 | 1/2001 | Kasper et al. |
| 6,173,651 B1 | 1/2001 | Pathe et al. |
| 6,192,548 B1 | 2/2001 | Huffman |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,282,526 B1 | 8/2001 | Ganesh |
| 6,283,034 B1 | 9/2001 | Miles, Jr. |
| 6,285,778 B1 | 9/2001 | Nakajima et al. |
| 6,285,930 B1 | 9/2001 | Dickson et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,400,048 B1 | 6/2002 | Nishimura et al. |
| 6,401,294 B2 | 6/2002 | Kasper |
| 6,408,226 B1 | 6/2002 | Byrne et al. |
| 6,415,203 B1 | 7/2002 | Inoue et al. |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,490,539 B1 | 12/2002 | Dickson et al. |
| 6,491,127 B1 * | 12/2002 | Holmberg et al. ............ 180/252 |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,525,509 B1 | 2/2003 | Petersson et al. |
| 6,535,793 B2 | 3/2003 | Allard |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,422 B1 | 6/2003 | Gordon et al. |
| 6,572,711 B2 | 6/2003 | Sclafani et al. |
| 6,580,246 B2 | 6/2003 | Jacobs |
| 6,584,376 B1 | 6/2003 | Van |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,611,120 B2 | 8/2003 | Song et al. |

(56) References Cited

U.S. PATENT DOCUMENTS

| | | |
|---|---|---|
| 6,611,734 B2 | 8/2003 | Parker et al. |
| 6,611,738 B2 | 8/2003 | Ruffner |
| 6,615,108 B1 | 9/2003 | Peless et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed, Jr. |
| 6,661,239 B1 | 12/2003 | Ozick |
| 6,662,889 B2 | 12/2003 | De et al. |
| 6,668,951 B2 | 12/2003 | Won |
| 6,670,817 B2 | 12/2003 | Fournier et al. |
| 6,687,571 B1 | 2/2004 | Byrne et al. |
| 6,690,993 B2 | 2/2004 | Foulke et al. |
| 6,697,147 B2 | 2/2004 | Ko et al. |
| 6,711,280 B2 | 3/2004 | Stafsudd et al. |
| 6,732,826 B2 | 5/2004 | Song et al. |
| 6,737,591 B1 | 5/2004 | Lapstun et al. |
| 6,741,364 B2 | 5/2004 | Lange et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,142,198 B2 | 11/2006 | Lee |
| 7,148,458 B2 | 12/2006 | Schell et al. |
| 7,155,308 B2 | 12/2006 | Jones |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,283,892 B1 | 10/2007 | Boillot et al. |
| 7,288,912 B2 | 10/2007 | Landry et al. |
| 7,318,248 B1 | 1/2008 | Yan |
| 7,320,149 B1 | 1/2008 | Huffman et al. |
| 7,324,870 B2 | 1/2008 | Lee |
| 7,328,196 B2 | 2/2008 | Peters |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,617,557 B2 | 11/2009 | Reindle |
| 7,620,476 B2 | 11/2009 | Morse et al. |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,693,605 B2 | 4/2010 | Park |
| 7,761,954 B2 * | 7/2010 | Ziegler et al. ............ 15/320 |
| 7,801,645 B2 | 9/2010 | Taylor et al. |
| 7,805,220 B2 | 9/2010 | Taylor et al. |
| 7,809,944 B2 | 10/2010 | Kawamoto |
| 7,849,555 B2 | 12/2010 | Hahm et al. |
| 7,853,645 B2 | 12/2010 | Brown et al. |
| 7,861,365 B2 * | 1/2011 | Sun et al. ............ 15/319 |
| 7,920,941 B2 | 4/2011 | Park et al. |
| 7,937,800 B2 | 5/2011 | Yan |
| 7,957,836 B2 | 6/2011 | Myeong et al. |
| 2001/0047231 A1 | 11/2001 | Peless et al. |
| 2002/0011813 A1 | 1/2002 | Koselka et al. |
| 2002/0016649 A1 | 2/2002 | Jones |

(56) References Cited

U.S. PATENT DOCUMENTS

| | | |
|---|---|---|
| 2002/0108209 A1 | 8/2002 | Peterson |
| 2002/0120364 A1 | 8/2002 | Colens |
| 2002/0156556 A1 | 10/2002 | Ruffner |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0192144 A1 | 10/2003 | Song et al. |
| 2003/0216834 A1 | 11/2003 | Allard |
| 2003/0233177 A1 | 12/2003 | Johnson et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074044 A1 | 4/2004 | Diehl et al. |
| 2004/0076324 A1 | 4/2004 | Burl et al. |
| 2004/0085037 A1 | 5/2004 | Jones et al. |
| 2004/0088079 A1 | 5/2004 | Lavarec et al. |
| 2004/0111184 A1 | 6/2004 | Chiappetta et al. |
| 2004/0134336 A1 | 7/2004 | Solomon |
| 2004/0134337 A1 | 7/2004 | Solomon |
| 2004/0148731 A1 | 8/2004 | Dayman et al. |
| 2004/0156541 A1 | 8/2004 | Jeon et al. |
| 2004/0158357 A1 | 8/2004 | Lee et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0010331 A1 | 1/2005 | Taylor et al. |
| 2005/0150074 A1 | 7/2005 | Diehl et al. |
| 2005/0150519 A1 | 7/2005 | Keppler et al. |
| 2005/0156562 A1 | 7/2005 | Cohen et al. |
| 2005/0187678 A1 | 8/2005 | Myeong et al. |
| 2005/0204717 A1 | 9/2005 | Colens |
| 2005/0209736 A1 | 9/2005 | Kawagoe |
| 2005/0213082 A1 | 9/2005 | DiBernardo et al. |
| 2005/0235451 A1 | 10/2005 | Yan |
| 2005/0273967 A1 | 12/2005 | Taylor et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0042042 A1 | 3/2006 | Mertes et al. |
| 2006/0060216 A1 | 3/2006 | Woo |
| 2006/0061657 A1 | 3/2006 | Rew et al. |
| 2006/0100741 A1 | 5/2006 | Jung |
| 2006/0259194 A1 | 11/2006 | Chiu |
| 2007/0016328 A1* | 1/2007 | Ziegler et al. ............... 700/245 |
| 2007/0017061 A1 | 1/2007 | Yan |
| 2007/0028574 A1 | 2/2007 | Yan |
| 2007/0032904 A1 | 2/2007 | Kawagoe |
| 2007/0042716 A1 | 2/2007 | Goodall et al. |
| 2007/0061041 A1 | 3/2007 | Zweig |
| 2008/0091304 A1 | 4/2008 | Ozick et al. |
| 2008/0184518 A1 | 8/2008 | Taylor et al. |
| 2008/0281470 A1 | 11/2008 | Gilbert et al. |
| 2008/0302586 A1 | 12/2008 | Yan |
| 2009/0007366 A1 | 1/2009 | Svendsen et al. |
| 2010/0268384 A1 | 10/2010 | Jones et al. |
| 2010/0312429 A1 | 12/2010 | Jones et al. |

FOREIGN PATENT DOCUMENTS

| | | |
|---|---|---|
| EP | 0748006 | 12/1996 |
| GB | 2213047 A | 8/1989 |
| JP | 53021869 U | 2/1978 |
| JP | 53110257 A | 9/1978 |
| JP | 57014726 A2 | 1/1982 |
| JP | 57064217 A | 4/1982 |
| JP | 59005315 B | 2/1984 |
| JP | 59033511 U | 3/1984 |
| JP | 59094005 A | 5/1984 |
| JP | 59099308 U | 7/1984 |
| JP | 59112311 U | 7/1984 |
| JP | 59120124 U | 8/1984 |
| JP | 59131668 U | 9/1984 |
| JP | 59164973 A | 9/1984 |
| JP | 59184917 A | 10/1984 |
| JP | 2283343 A2 | 11/1984 |
| JP | 59212924 A | 12/1984 |
| JP | 59226909 A | 12/1984 |
| JP | 60089213 U | 6/1985 |
| JP | 60211510 A | 10/1985 |
| JP | 60259895 A | 12/1985 |
| JP | 61097712 A | 5/1986 |
| JP | 61023221 B | 6/1986 |
| JP | 62074018 A | 4/1987 |
| JP | 62070709 U | 5/1987 |
| JP | 62164431 U | 10/1987 |
| JP | 62263507 A | 11/1987 |
| JP | 62263508 A | 11/1987 |
| JP | 62189057 U | 12/1987 |
| JP | 63158032 A | 7/1988 |
| JP | 3197758 A | 8/1991 |
| JP | 3201903 A | 9/1991 |
| JP | 4019586 B | 3/1992 |
| JP | 4084921 A | 3/1992 |
| JP | 5023269 B | 4/1993 |
| JP | 5042076 U | 6/1993 |
| JP | 5046246 U | 6/1993 |
| JP | 5150827 A | 6/1993 |
| JP | 5150829 A | 6/1993 |
| JP | 5054620 U | 7/1993 |
| JP | 5040519 Y2 | 10/1993 |
| JP | 5257533 A | 10/1993 |
| JP | 6003251 Y2 | 1/1994 |
| JP | 6137828 A | 5/1994 |
| JP | 6105781 B | 12/1994 |
| JP | 7059702 A2 | 3/1995 |
| JP | 7222705 A2 | 8/1995 |
| JP | 7270518 A | 10/1995 |
| JP | 7281742 A2 | 10/1995 |
| JP | 7313417 A | 12/1995 |
| JP | 8089449 A | 4/1996 |
| JP | 2520732 B2 | 5/1996 |
| JP | 8123548 A | 5/1996 |
| JP | 8152916 A2 | 6/1996 |
| JP | 8263137 A | 10/1996 |
| JP | 8322774 A2 | 12/1996 |
| JP | 9044240 A | 2/1997 |
| JP | 9066855 A | 3/1997 |
| JP | 9160644 A2 | 6/1997 |
| JP | 9179625 A2 | 7/1997 |
| JP | 9179685 A2 | 7/1997 |
| JP | 02555263 Y2 | 11/1997 |
| JP | 10055215 A | 2/1998 |
| JP | 10117973 A | 5/1998 |
| JP | 10118963 A | 5/1998 |
| JP | 10177414 A | 6/1998 |
| JP | 10228316 | 8/1998 |
| JP | 10295595 A | 11/1998 |
| JP | 11015941 A | 1/1999 |
| JP | 11085269 A2 | 3/1999 |
| JP | 11102219 A2 | 4/1999 |
| JP | 11102220 A | 4/1999 |
| JP | 11162454 A | 6/1999 |
| JP | 11174145 A | 7/1999 |
| JP | 11175149 A | 7/1999 |
| JP | 11212642 A2 | 8/1999 |
| JP | 11213157 A | 8/1999 |

(56) References Cited

FOREIGN PATENT DOCUMENTS

| JP | 11295412 A | 10/1999 |
|---|---|---|
| JP | 2000047728 A | 2/2000 |
| JP | 2000056006 A | 2/2000 |
| JP | 2000056831 A | 2/2000 |
| JP | 2000066722 A | 3/2000 |
| JP | 2000075925 A | 3/2000 |
| JP | 10240343 A2 | 5/2000 |
| JP | 2000275321 A | 10/2000 |
| JP | 2000353014 A | 12/2000 |
| JP | 2000353014 A2 | 12/2000 |
| JP | 2001067588 A | 3/2001 |
| JP | 2001087182 | 4/2001 |
| JP | 2001121455 A | 5/2001 |
| JP | 2001216482 A | 8/2001 |
| JP | 2001265437 A | 9/2001 |
| JP | 2002366227 A | 12/2002 |
| JP | 2002369778 A | 12/2002 |
| JP | 2003010076 A | 1/2003 |
| JP | 2003010088 A | 1/2003 |
| JP | 2003084994 A | 3/2003 |
| JP | 2003167628 A | 6/2003 |
| JP | 2003180587 A | 7/2003 |
| JP | 2003262520 A | 9/2003 |
| JP | 2003304992 A | 10/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004174228 A | 6/2004 |
| JP | 2005118354 A | 5/2005 |
| JP | 2005224265 A | 8/2005 |
| JP | 2005230032 A | 9/2005 |
| JP | 2005245916 A | 9/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 04074285 B2 | 4/2008 |
| JP | 2009015611 A | 1/2009 |
| JP | 20100198552 A | 9/2010 |
| WO | WO2004058028 | 7/2004 |
| WO | WO2005082223 A1 | 9/2005 |

OTHER PUBLICATIONS

Ascii, Mar. 25, 2002, http://ascii.jp/elem/000/000/330/330024/ accessed Nov. 1, 2011.

U.S. Appl. No. 60/605,066 as provided to WIPO in PCT/US2005/030422, corresponding to U.S. National Stage Entry U.S. Appl. No. 11/574,290, U.S. publication 2008/0184518, filed Aug. 27, 2004.

U.S. Appl. No. 60/605,181 as provided to WIPO in PCT/US2005/030422, corresponding to U.S. National Stage Entry U.S. Appl. No. 11/574,290, U.S. publication 2008/0184518, filed Aug. 27, 2004.

Derek Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.

Electrolux Trilobite, Jan. 12, 2001, http://www.electrolux-ui.com:8080/2002%5C822%5C833102EN.pdf, accessed Jul. 2, 2012, 10 pages.

Florbot GE Plastics, 1989-1990, 2 pages, available at http://www.fuseid.com/, accessed Sep. 27, 2012.

Gregg et al., "Autonomous Lawn Care Applications," 2006 Florida Conference on Recent Advances in Robotics, Miami, Florida, May 25-26, 2006, Florida International University, 5 pages.

Home Robot—UBOT; Microbotusa.com, retrieved from the WWW at www.microrobotusa.com, accessed Dec. 2, 2008.

King and Weiman, "Helpmate™ Autonomous Mobile Robots Navigation Systems," SPIE vol. 1388 Mobile Robots, pp. 190-198 (1990).

Li et al. "Robust Statistical Methods for Securing Wireless Localization in Sensor Networks," Information Procesing in Sensor Networks, 2005, Fourth International Symposium on, pp. 91-98, Apr. 2005.

Martishevcky, "The Accuracy of point light target coordinate determination by dissectoral tracking system", SPIE vol. 2591, pp. 25-30, Oct. 23, 2005.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.

Roboking—not just a vacuum cleaner, a robot!, Jan. 21, 2004, infocom.uz/2004/01/21/robokingne-prosto-pyilesos-a-robot/, accessed Oct. 10, 2011, 7 pages.

Sebastian Thrun, "Learning Occupancy Grid Maps With Forward Sensor Models," Autonomous Robots 15, 111-127, Sep. 1, 2003.

SVET Computers—New Technologies—Robot Vacuum Cleaner, Oct. 1999, available at http://www.sk.rs/1999/10/sknt0l.html, accessed Nov. 1, 2011.

Written Opinion of the International Searching Authority, PCT/US2004/001504, Aug. 20, 2012, 9 pages.

U.S. Appl. No. 60/605,066, filed Aug. 27, 2004, Taylor.

U.S. Appl. No. 60/605,181, filed Aug. 27, 2004, Taylor.

OnRobo "Samsung Unveils Its Multifunction Robot Vacuum", www.onrobo.com/enews/02101samsung_vacuum.shtml, 3 pages, Mar. 18, 2005.

Pages et al. "Optimizing Plane-to-Plane Positioning Tasks by Image-Based Visual Servoing and Structured Light", IEEE Transactions on Robotics, vol. 22, No. 5, pp. 1000-1010, Oct. 2006.

Pages et al. "A camera-projector system for robot positioning by visual servoing", Proceedings of the 2006 Conference on Computer Vision and Pattern Recognition Workshop (CVPRW06), 8 pages, Jun. 17-22, 2006.

Pages, et al. "Robust decoupled visual servoing based on structured light", 2005 IEEE/RSJ Int. Conf. on Intelligent Robots and Systems, pp. 2676-2681, 2005.

Park et al. "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun. 27-Jul. 2, 1994.

Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).

Penna, et al. "Models for Map Building and Navigation", IEEE Transactions on Systems. Man. and Cybernetics. vol. 23 No. 5, pp. 1276-1301, Sep./Oct. 1993.

Pirjanian "Reliable Reaction", Proceedings of the 1996 IEEE/SICE/RSJ International Conference on Multisensor Fusion and Integration for Intelligent Systems, pp. 158-165, 1996.

Pirjanian "Challenges for Standards for consumer Robotics", IEEE Workshop on Advanced Robotics and its Social impacts, pp. 260-264, Jun. 12-15, 2005.

Pirjanian et al. "Distributed Control for a Modular, Reconfigurable Cliff Robot", Proceedings of the 2002 IEEE International Conference on Robotics & Automation, Washington, D.C. pp. 4083-4088, May 2002.

Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.

Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.

Pirjanian et al. "A decision-theoretic approach to fuzzy behavior coordination", 1999 IEEE International Symposium on Computa-

(56) References Cited

OTHER PUBLICATIONS tional Intelligence in Robotics and Automation, 1999. Cira '99., Monterey, CA, pp. 101-106, Nov. 8-9, 1999.
Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430, Apr. 1997.
Prassler et al., "A Short History of Cleaning Robots", Autonomous Robots 9, 211-226, 2000, 16 pages.
Remazeilles, et al. "Image based robot navigation in 3D environments", Proc. of SPIE, vol. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan. 2001: "A Clean Sweep" (Jan. 2001), 5 pages.
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Malik et al. "Virtual Prototyping for Conceptual Design of a Tracked Mobile Robot". Electrical and Computer Engineering, Canadian Conference on, IEEE, PI. May 1, 2006, pp. 2349-2352.
Sahin, et al. "Development of a Visual Object Localization Module for Mobile Robots", 1999 Third European Workshop on Advanced Mobile Robots, (Eurobot '99), pp. 65-72, 1999.
Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.
Sato "Range Imaging Based on Moving Pattern Light and Spatio-Temporal Matched Filter", Proceedings International Conference on Image Processing, vol. 1., Lausanne, Switzerland, pp. 33-36, Sep. 16-19, 1996.
Schenker, et al. "Lightweight rovers for Mars science exploration and sample return", Intelligent Robots and Computer Vision XVI, SPIE Proc. 3208, pp. 24-36, 1997.
Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim, et al "Learning Visual Landmarks for Pose Estimation", IEEE International Conference on Robotics and Automation, vol. 3, Detroit, MI, pp. 1972-1978, May 10-15, 1999.
Sobh et al. "Case Studies in Web-Controlled Devices and Remote Manipulation", Automation Congress, 2002 Proceedings of the 5th Biannual World, pp. 435-440, Dec. 10, 2002.
Stella, et al. "Self-Location for Indoor Navigation of Autonomous Vehicles", Part of the SPIE conference on Enhanced and Synthetic Vision SPIE vol. 3364 pp. 298-302, 1998.
Summet "Tracking Locations of Moving Hand-held Displays Using Projected Light", Pervasive 2005, LNCS 3468 pp. 37-46 (2005).
Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.
Takio et al. "Real-Time Position and Pose Tracking Method of Moving Object Using Visual Servo System", 47th IEEE International Symposium on Circuits and Systems, pp. 167-170, 2004.
Teller "Pervasive pose awareness for people, Objects and Robots", http://www.ai.mit.edu/lab/dangerous-ideas/Spring2003/teller-pose.pdf, 6 pages, Apr. 30, 2003.
Terada et al. "An Acquisition of the Relation between Vision and Action using Self-Organizing Map and Reinforcement Learning", 1998 Second International Conference on Knowledge-Based Intelligent Electronic Systems, Adelaide, Australiam pp. 429-434, Apr. 21-23, 1998.
The Sharper Image "Robotic Vacuum Cleaner—Blue" www.Sharperimage.com, 2 pages, Mar. 18, 2005.
The Sharper Image "E Vac Robotic Vacuum", www.sharperiamge.com/us/en/templates/products/pipmorework1printable.jhtml, 2 pages, Mar. 18, 2005.
TheRobotStore.com "Friendly Robotics Robotic Vacuum RV400—The Robot Store", www.therobotstore.com/s.nl/sc.9/category.-109/itA/id.43/.f, 1 page, Apr. 20, 2005.
TotalVac.com RC3000 RoboCleaner website Mar. 18, 2005, 3 pages.
Trebi-Ollennu et al. "Mars Rover Pair Cooperatively Transporting a Long Payload", Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," 2007, IEEE, p. 1393-1399.
Tse et al. "Design of a Navigation System for a Household Mobile Robot Using Neural Networks", Department of Manufacturing Engg. & Engg. Management, City University of Hong Kong, pp. 2151-2156, 1998.
UAMA (Asia) Industrial Co., Ltd. "RobotFamily", 2005, 1.
Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.
Watts "Robot, boldly goes where no man can", The Times—pp. 20, Jan. 1985.
Wijk et al. "Triangulation-Based Fusion of Sonar Data with Application in Robot Pose Tracking ", IEEE Transactions on Robotics and Automation, vol. 16, No. 6, pp. 740-752, Dec. 2000.
Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May 2002.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>> Robot Business", ED Online ID# 13114, 17 pages, Jul. 2006.
Yamamoto et al. "Optical Sensing for Robot Perception and Localization", 2005 IEEE Workshop on Advanced Robotics and its Social Impacts, pp. 14-17, 2005.
Yata et al. "Wall Following Using Angle Information Measured by a Single Ultrasonic Transducer", Proceedings of the 1998 IEEE, International Conference on Robotics & Automation, Leuven, Belgium, pp. 1590-1596, May 1998.
Yun, et al. "Image-Based Absolute Positioning System for Mobile Robot Navigation", IAPR International Workshops SSPR, Hong Kong, pp. 261-269, Aug. 17-19, 2006.
Yun, et al. "Robust Positioning a Mobile Robot with Active Beacon Sensors", Lecture Notes in Computer Science, 2006, vol. 4251, pp. 890-897, 2006.
Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.
Zha et al. "Mobile Robot Localization Using Incomplete Maps for Change Detection in a Dynamic Environment", Advanced Intelligent Mechatronics '97. Final Program and Abstracts., IEEE/ASME International Conference, pp. 110, Jun. 16-20, 1997.
Zhang, et al. "A Novel Mobile Robot Localization Based on Vision", SPIE vol. 6279, 6 pages, Jan. 29, 2007.
Dyson's Robot Vacuum Cleaner—the DC06, May 2, 2004 http://www.gizmag.com/go/1282/ accessed Nov. 11, 2011, 3 pages.
Electrolux Trilobite, Time to enjoy life, 26 pages http://www.robocon.co.kr/trilobite/Presentation_Trilobite_Kor_030104.ppt accessed Dec. 22, 2011.
Facts on the Trilobite http://www.frc.ri.cmu.edu/~hpm/talks/Extras/trilobite.desc.html, 2 pages, accessed Nov. 1, 2011.
Friendly Robotics, 18 pages http://www.robotsandrelax.com/PDFs/RV400Manual.pdf accessed Dec. 22, 2011.
Hitachi, May 29, 2003 http://www.hitachi.co.jp/New/cnews/hl_030529_hl_030529.pdf 8 pages.

(56) References Cited

OTHER PUBLICATIONS

Robot Buying Guide, LG announces the first robotic vacuum cleaner for Korea, Apr. 21, 2003 http://robotbg.com/news/2003/04122/lg_announces_the_first_robotic_vacu, 1 page.

UBOT, cleaning robot capable of wiping with a wet duster, http://us.aving.net/news/view.php?articleId=23031, 4 pages accessed Nov. 1, 2011.

Taipei Times, Robotic vacuum by Matsuhita about of undergo testing, Mar. 26, 2002 http://www.taipeitimes.com/News/worldbiz/archives/2002/03/2610000129338 accessed, 2 pages.

Yujin Robotics, an intelligent cleaning robot 'iclebo Q' AVING USA http://us.aving.net/news/view/php?articleId=7257, 8 pages, accessed Nov. 4, 2011.

McLurkin "The Ants: A community of Microrobots", Paper submitted for requirements of BSEE MIT, May 12, 1995, 60 pages.

Grumet "Robots Clean House", Popular Mechanics, Nov. 2003, 3 pages.

McLurkin Stupid Robot Tricks: A Behavior-based Distributed Algorithm Library for Programming Swarms of Robots, Paper submitted for requirements of BSEE at MIT, May 2004, 127 pages.

Kurs et al, Wireless Power transfer via Strongly Coupled Magnetic Resonances, Downloaded from www.sciencemag.org , Aug. 17, 2007, 5 pages.

Borges et al. "Optimal Mobile Robot Pose Estimation Using Geometrical Maps", IEEE Transactions on Robotics and Automation, vol. 18, No. 1, pp. 87-94, Feb. 2002.

Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.

Bulusu, et al. "Self Configuring Localization systems: Design and Experimental Evaluation", ACM Transactions on Embedded Computing Systems vol. 3 No. 1 pp. 24-60, 2003.

Caccia, et al. "Bottom-Following for Remotely Operated Vehicles", 5th IFAC conference, Alaborg, Denmark, pp. 245-250 Aug. 1, 2000.

Chae, et al. "StarLITE: A new artificial landmark for the navigation of mobile robots", http://www.irc.atr.jp/jk-nrs2005/pdf/Starlite.pdf, 4 pages, 2005.

Chamberlin et al. "Team 1: Robot Locator Beacon System" NASA Goddard SFC, Design Proposal, 15 pages, Feb. 17, 2006.

Champy "Physical management of IT assets in Data Centers using RFID technologies", RFID 2005 University, Oct. 12-14, 2005.

Chiri "Joystick Control for Tiny OS Robot", http://www.eecs.berkeley.edu/Programs/ugrad/superb/papers2002/chiri.pdf. 12 pages, Aug. 8, 2002.

Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.

Clerentin, et al. "A localization method based on two omnidirectional perception systems cooperation" Proc of IEEE International Conference on Robotics & Automation, San Francisco, CA vol. 2, pp. 1219-1224, Apr. 2000.

Corke "High Performance Visual serving for robots end-point control". SPIE vol. 2056 Intelligent robots and computer vision 1993.

Cozman et al. "Robot Localization using a Computer Vision Sextant", IEEE International Midwest Conference on Robotics and Automation, pp. 106-111, 1995.

D'Orazio, et al. "Model based Vision System for mobile robot position estimation", SPIE vol. 2058 Mobile Robots VIII, pp. 38-49, 1992.

De Bakker, et al. "Smart PSD—array for sheet of light range imaging", Proc. of SPIE vol. 3965, pp. 1-12, May 15, 2000.

Desaulniers, et al. "An Efficient Algorithm to find a shortest path for a car-like Robot", IEEE Transactions on robotics and Automation vol. 11 No. 6, pp. 819-828, Dec. 1995.

Dorfmüller-Ulhaas "Optical Tracking From User Motion to 3D Interaction", http://www.cg.tuwien.ac.at/research/publications/2002/Dorimueller-Ulhaas-thesis, 182 pages, 2002.

Dorsch, et al. "Laser Triangulation: Fundamental uncertainty in distance measurement", Applied Optics, vol. 33 No. 7, pp. 1306-1314, Mar. 1, 1994.

Dudek, et al. "Localizing a Robot with Minimum Travel" Proceedings of the sixth annual ACM-SIAM symposium on Discrete algorithms, vol. 27 No. 2 pp. 583-604, Apr. 1998.

Dulimarta, et al. "Mobile Robot Localization in Indoor Environment", Pattern Recognition, vol. 30, No. 1, pp. 99-111, 1997.

EBay "Roomba Timer -> Timed Cleaning—Floorvac Robotic Vacuum", Cgi.ebay.com/ws/eBayISAPI.dll?viewitem&category=43526&item=4375198387&rd=1, 5 pages, Apr. 20, 2005.

Electrolux "Welcome to the Electrolux trilobite" www.electroluxusa.com/node57.asp?currentURL=node142.asp%3F, 2 pages, Mar. 18, 2005.

Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95. pp. 548-551, 1995.

Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.

Becker, et al. "Reliable Navigation Using Landmarks" IEEE International Conference on Robotics and Automation, 0-7803-1965-6, pp. 401-406, 1995.

Benayad-Cherif, et al., "Mobile Robot Navigation Sensors" SPIE vol. 1831 Mobile Robots, VII, pp. 378-387, 1992.

Facchinetti, Claudio et al. "Using and Learning Vision-Based Self-Positioning for Autonomous Robot Navigation", ICARCV '94, vol. 3 pp. 1694-1698, 1994.

M. Betke and L. Gurvits, "Mobile robot localization using landmarks", IEEE Trans. Robot. Automat., vol. 13, pp. 251-263 (1997).

Facchinetti, Claudio et al. "Self-Positioning Robot Navigation Using Ceiling Images Sequences", ACCV '95, 5 pages, Dec. 5-8, 1995.

Fairfield, Nathaniel et al. "Mobile Robot Localization with Sparse Landmarks", SPIE vol. 4573 pp. 148-155, 2002.

Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.

Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.

Franz, et al. "Biomimetric robot navigation", Robotics and Autonomous Systems vol. 30 pp. 133-153, 2000.

Friendly Robotics "Friendly Robotics—Friendly Vac, Robotic Vacuum Cleaner", www.friendlyrobotics.com/vac.htm. 5 pages Apr. 20, 2005.

Fuentes, et al. "Mobile Robotics 1994", University of Rochester. Computer Science Department, TR 588, 44 pages, Dec. 7, 1994.

Bison, P et al., "Using a structured beacon for cooperative position estimation" Robotics and Autonomous Systems vol. 29, No. 1, pp. 33-40, Oct. 1999.

Fukuda, et al. "Navigation System based on Ceiling Landmark Recognition for Autonomous mobile robot", 1995 IEEE/RSJ International Conference on Intelligent Robots and Systems 95. 'Human Robot Interaction and Cooperative Robots', Pittsburgh, PA, pp. 1466-1471, Aug. 5-9, 1995.

Gionis "A hand-held optical surface scanner for environmental Modeling and Virtual Reality", Virtual Reality World, 16 pages 1996.

Goncalves et al. "A Visual Front-End for Simultaneous Localization and Mapping", Proceedings of the 2005 IEEE International Conference on Robotics and Automation, Barcelona, Spain, pp. 44-49, Apr. 2005.

Hamamatsu "SI PIN Diode S5980, S5981 S5870-Multi-element photodiodes for surface mounting", Hamatsu Photonics, 2 pages Apr. 2004.

Hammacher Schlemmer "Electrolux Trilobite Robotic Vacuum" www.hammacher.com/publish/71579.asp?promo=xsells, 3 pages, Mar. 18, 2005.

(56) References Cited

OTHER PUBLICATIONS

Haralick et al. "Pose Estimation from Corresponding Point Data", IEEE Transactions on systems, Man, and Cybernetics, vol. 19, No. 6, pp. 1426-1446, Nov. 1989.

Hausler "About the Scaling Behaviour of Optical Range Sensors", Fringe '97, Proceedings of the 3rd International Workshop on Automatic Processing of Fringe Patterns, Bremen, Germany, pp. 147-155, Sep. 15-17, 1997.

Blaasvaer, et al. "AMOR-An Autonomous Mobile Robot Navigation System", Proceedings of the IEEE International Conference on Systems, Man, and Cybernetics, pp. 2266-2271, 1994.

Hoag, et al. "Navigation and Guidance in interstellar space", ACTA Astronautica vol. 2, pp. 513-533 , Feb. 14, 1975.

Huntsberger et al. "CAMPOUT: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php?ubre=111, 3 pages, Mar. 18, 2005.

Jarosiewicz et al. "Final Report—Lucid", University of Florida, Departmetn of Electrical and Computer Engineering, EEL 5666—Intelligent Machine Design Laboratory, 50 pages, Aug. 4, 1999.

Jensfelt, et al. "Active Global Localization for a mobile robot using multiple hypothesis tracking", IEEE Transactions on Robots and Automation vol. 17, No. 5, pp. 748-760, Oct. 2001.

Jeong, et al. "An intelligent map-building system for indoor mobile robot using low cost photo sensors", SPIE vol. 6042 6 pages, 2005.

Kahney, "Robot Vacs are in the House," www.wired.com/news/technology/o,1282,59237,00.html, 6 pages, Jun. 18, 2003.

Karcher "Karcher RoboCleaner RC 3000", www.robocleaner.de/english/screen3.html, 4 pages, Dec. 12, 2003.

Karcher USA "RC 3000 Robotics cleaner", www.karcher-usa.com, 3 pages, Mar. 18, 2005.

Karlsson et al., The vSLAM Algorithm for Robust Localization and Mapping, Proceedings of the 2005 IEEE International Conference on Robotics and Automation, Barcelona, Spain, pp. 24-29, Apr. 2005.

Karlsson, et al Core Technologies for service Robotics, IEEE/RSJ International Conference on Intelligent Robots and Systems (IROS 2004), vol. 3, pp. 2979-2984, Sep. 28-Oct. 2, 2004.

Kleinberg, The Localization Problem for Mobile Robots, Laboratory for Computer Science, Massachusetts Institute of Technology, 1994 IEEE, pp. 521-531, 1994.

Knight, et al., "Localization and Identification of Visual Landmarks", Journal of Computing Sciences in Colleges, vol. 16 Issue 4, 2001 pp. 312-313, May 2001.

Kolodko et al. "Experimental System for Real-Time Motion Estimation", Proceedings of the 2003 IEEE/ASME International Conference on Advanced Intelligent Mechatronics (AIM 2003), pp. 981-986, 2003.

Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.

Krotov, et al. "Digital Sextant", Downloaded from the internet at: http://www.cs.cmu.edu/~epk/ , 1 page, 1995.

Krupa et al. "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.

Kuhl, et al. "Self Localization in Environments using Visual Angles", VRCAI '04 Proceedings of the 2004 ACM SIGGRAPH international conference on Virtual Reality continuum and its applications in industry, pp. 472-475, 2004.

Kurth, "Range-Only Robot Localization and SLAM with Radio", http://www.ri.cmu.edu/pub_files/pub4/kurth_derek_2004_1/kurth_derek_2004_1.pdf. 60 pages, May 2004.

Lambrinos, et al. "A mobile robot employing insect strategies for navigation", http://www8.cs.umu.se/kurser/TDBD17/VT04/dl/Assignment%20Papers/lambrinos-RAS-2000.pdf, 38 pages, Feb. 19, 1999.

Lang et al. "Visual Measurement of Orientation Using Ceiling Features", 1994 IEEE, pp. 552-555, 1994.

Lapin, "Adaptive position estimation for an automated guided vehicle", SPIE vol. 1831 Mobile Robots VII, pp. 82-94, 1992.

LaValle et al. "Robot Motion Planning in a Changing, Partially Predictable Environment", 1994 IEEE International Symposium on Intelligent Control, Columbus, OH, pp. 261-266, Aug. 16-18, 1994.

Lee, et al. "Localization of a Mobile Robot Using the Image of a Moving Object", IEEE Transaction on Industrial Electronics, vol. 50, No. 3 pp. 612-619, Jun. 2003.

Lee, et al. "Development of Indoor Navigation system for Humanoid Robot Using Multi-sensors Integration", ION NTM, San Diego, CA pp. 798-805, Jan. 22-24, 2007.

Leonard, et al. "Mobile Robot Localization by tracking Geometric Beacons", IEEE Transaction on Robotics and Automation, vol. 7, No. 3 pp. 376-382, Jun. 1991.

Li et al. "Making a Local Map of Indoor Environments by Swiveling a Camera and a Sonar", Proceedings of the 1999 IEEE/RSJ International Conference on Intelligent Robots and Systems, pp. 954-959, 1999.

Lin, et al.. "Mobile Robot Navigation Using Artificial Landmarks", Journal of robotics System 14(2). pp. 93-106, 1997.

Linde "Dissertation, "On Aspects of Indoor Localization"" https://eldorado.tu-dortmund.de/handle/2003/22854, University of Dortmund, 138 pages, Aug. 28, 2006.

Lumelsky, et al. "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," 2002, IEeE, p. 2359-2364.

Ma "Thesis: Documentation on Northstar", California Institute of Technology, 14 pages, May 17, 2006.

Madsen, et al. "Optimal landmark selection for triangulation of robot position", Journal of Robotics and Autonomous Systems vol. 13 pp. 277-292, 1998.

Matsutek Enterprises Co. Ltd "Automatic Rechargeable Vacuum Cleaner", http://matsutek.manufacturer.globalsources.com/si/6008801427181/pdtl/Home-vacuum/10..., Apr. 23, 2007, 3 pages.

McGillem, et al. "Infra-red Lacation System for Navigation and Autonomous Vehicles", 1988 IEEE International Conference on Robotics and Automation, vol. 2, pp. 1236-1238, Apr. 24-29, 1988.

McGillem, et al. "A Beacon Navigation Method for Autonomous Vehicles", IEEE Transactions on Vehicular Technology, vol. 38, No. 3, pp. 132-139, Aug. 1989.

Michelson "Autonomous Navigation", 2000 Yearbook of Science & Technology, McGraw-Hill, New York, ISBN 0-07-052771-7, pp. 28-30, 1999.

Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.

MobileMag "Samsung Unveils High-tech Robot Vacuum Cleaner", http://www.mobilemag.com/content/100/102/C2261/, 4 pages, Mar. 18, 2005.

Monteiro, et al. "Visual Servoing for Fast Mobile Robot: Adaptive Estimation of Kinematic Parameters", Proceedings of the IECON '93., International Conference on Industrial Electronics, Maui, HI, pp. 1588-1593, Nov. 15-19, 1993.

Moore, et al. A simple Map-bases Localization strategy using range measurements, SPIE vol. 5804 pp. 612-620, 2005.

Munich et al. "Sift-ing Through Features with ViPR", IEEE Robotics & Automation Magazine, pp. 72-77, Sep. 2006.

Munich et al. "ERSP: A Software Platform and Architecture for the Service Robotics Industry", Intelligent Robots and Systems, 2005. (IROS 2005), pp. 460-467, Aug. 2-6, 2005.

(56) References Cited

OTHER PUBLICATIONS

Nam, et al. "Real-Time Dynamic Visual Tracking Using PSD Sensors and extended Trapezoidal Motion Planning", Applied Intelligence 10, pp. 53-70, 1999.

Nitu et al. "Optomechatronic System for Position Detection of a Mobile Mini-Robot", IEEE Ttransactions on Industrial Electronics, vol. 52, No. 4, pp. 969-973, Aug. 2005.

On Robo "Robot Reviews Samsung Robot Vacuum (VC-RP3OW)", www.onrobo.com/reviews/AT_Home/vacuum_cleaners/on00vcrb30rosam/index.htm.. 2 pages, 2005.

InMach "Intelligent Machines", www.inmach.de/inside.html, 1 page, Nov. 19, 2008.

Innovation First "2004 EDU Robot Controller Reference Guide", http://www.ifirobotics.com, 13 pgs., Mar. 1, 2004.

\* cited by examiner

MODULAR ROBOT

This U.S. patent application is a continuation of and claims priority, under 35 U.S.C. §120, to U.S. application Ser. No. 11/633,886, filed Dec. 4, 2006, which claims priority under 35 U.S.C. 119(e) to a U.S. provisional patent application filed on Dec. 2, 2005, entitled "ROBOT NETWORKING, THEMING AND COMMUNICATION SYSTEM" and having assigned Ser. No. 60/741,442, the entire contents of which are hereby incorporated by reference.

TECHNICAL FIELD

This invention relates to robots, and more particularly to coverage robots.

BACKGROUND

In the field of home, office and/or consumer-oriented robotics, mobile robots that perform household functions such as vacuum cleaning have been widely adopted, and examples of robots that perform floor washing, patrolling, lawn cutting and other such tasks may be found. Mobile robots contain many components, some of which may wear out or require service before other components. Generally, when one component fails the robot may be greatly hindered or fail as a whole. A user may be required to send the whole robot to a repair service for servicing, which may then require disassembling significant portions of the robot, or if the repair cost exceeds the value of the robot, the robot may be discarded. Alternatively, the user may need to purchase an entirely new robot.

SUMMARY

Coverage robots have a number of components that may require periodic servicing over the life of the robot. A coverage robot is used for covering a surface. This includes cleaning as well as polishing, painting, resurfacing, sweeping, sterilizing, applying treatments, and more. A modular coverage robot that allows the removal of discrete components or assemblies for repair or replacement improves the serviceability of the robot and increases the overall life of the robot. In addition, some modules can be changed for an alternative module that fits in the same shaped cavity but has different functionality. In general, the following modules can be removed from a coverage robot and replaced without affecting the functionality of the robot: a main cleaning head, a side brush cleaning head, a wheel module, a vacuum bin, a replaceable upper panel or cover, a remote control dockable in a cover, a replaceable lower retaining panel, cover or skid, a battery, a bumper, and a front wheel caster.

In one aspect, the coverage robot includes a chassis, multiple drive wheel assemblies disposed on the chassis, and a working assembly including a working head (e.g., cleaning assembly) carried by the chassis. Each drive wheel assembly (e.g., drive wheel module) includes a drive wheel assembly housing, a wheel rotatably coupled to the housing, and a wheel drive motor carried by the drive wheel assembly housing and operable to drive the wheel. The cleaning assembly (e.g., work head module) includes a cleaning assembly housing, a cleaning head rotatably coupled (e.g., a work head coupled for working movement) to the cleaning assembly housing, and a cleaning drive motor carried by cleaning assembly housing and operable to drive the cleaning head. The wheel assemblies and the cleaning assembly are each separately and independently removable from respective receptacles of the chassis as cartridges or complete units. The receptacles may be shaped cavities having receiving walls which surround and guide matching outer wall shapes of a cartridge or module, such that each module slips into and fits a corresponding shaped cavity. Parallel with at least one (e.g., insertion) direction, the walls of the module and corresponding shaped cavity may be essentially parallel, so that a module is guided to enter a mating shaped cavity along a straight line. The modules may be secured in the chassis by fasteners and/or an access or retaining cover.

In one implementation, each drive wheel assembly also includes a linkage suspending the wheel from a forward portion of the chassis. By connecting a first end of the linkage to a forward portion of the chassis and allowing the wheel connected to a second end of the linkage to move radially about the first end of the linkage and vertically with respect to the chassis, the robot can traverse thresholds and transitions easier than a robot without such a linkage. The linkage also facilitates an upwind tilt of the chassis in response to torque from the wheel which also aids the robot's traversal of thresholds and transitions.

In another example, wheel assembly (modular or not modular) includes at least part of a proximity sensor to detect an absence of an adjacent floor. The proximity sensor may be an infrared (IR) emitter and receiver pair, where the IR emitter and receiver are located on either side of the wheel and positioned to emit and receive an IR beam emitted at an angle that reflects off a floor surface below the wheel. In the absence of a floor, the emitted IR beam is not reflected off the floor and not received by the IR receiver. When the proximity sensor senses an absence of the floor, a robot controller is notified so as to initiate a cliff avoidance maneuver.

In one implementation, each wheel assembly also includes a power connector disposed on an outer surface of the drive wheel assembly housing and configured to mate with a corresponding chassis power connector within its respective receptacle as the drive wheel assembly is placed within the receptacle, to establish an electric power connection to the wheel assembly. Similarly, the cleaning assembly may also include a power connector disposed on an outer surface of the cleaning assembly housing and configured to mate with a corresponding chassis power connector within its respective receptacle as the cleaning assembly is placed within the receptacle, to establish an electric power connection to the cleaning assembly. The connectors may align with one another in a straight line as a module in guided to enter a mating shaped cavity along a straight line.

In some implementations, the power connector for each module is a tool-less (operable without tools) module-side electrical plugs that mates with a corresponding tool-less module-side electrical plugs on the chassis.

In one example, the cleaning robot also includes an electric battery or electrochemical cell carried by the chassis. The electric battery provides power to the robot.

In another example, the cleaning robot includes a removable caster wheel assembly disposed on the chassis. The removable caster wheel assembly provides additional support between the robot and the floor.

In another example, the robot includes a removable cover (e.g., a retaining or access cover) secured to a bottom of the chassis. The cover secures each wheel assembly and cleaning assembly within their respective receptacles. The robot may also include a removable cover (e.g., an aesthetic or functional panel, e.g., as disclosed in U.S. Provisional Patent Application No. 60/741,442, herein incorporated by reference in its entirety) disposed on an upper portion of the chassis. The removable cover on the upper portion of the chassis allows an owner to attach themed or functional covers or panels having a variety of colors and indicia; or, e.g., additional sensors for, e.g., navigation or obstacle detection. In one instance, the removable cover includes a segmented maintenance display panel substantially mimicking the appearance of the robot. Illuminable indicia corresponding to each module receptacle is disposed on the segmented maintenance display. The module receptacles individually correspond to a drive wheel assembly, cleaning assembly, battery, or cleaning bin, respectively. In another instance, the removable cover includes an audio output device for delivering instructions or alerting a user of a jam or some other problem with the robot. The controller board on the robot controls the illumination of indicia and the audio responses from the audio output device to communicate service needs or instructions to a user.

The controller may use the illuminable indicia to communicate information to a user. Some examples include: a steady light indicates module issue; a blinking light indicates usage of a module; no blinking light during normal rotation of the cleaning head during cleaning; blinking light during reverse rotation of the cleaning head during a surface prep operation.

In some implementations, the robot includes a removable bumper disposed on a forward portion of the chassis. The bumper protects the robot and objects that come in contact with the bumper.

In one example, the cleaning robot includes a cleaning bin carried by the chassis and arranged to collect debris (including, e.g., waste liquid) removed from a work surface by the cleaning head. The cleaning bin may include a bin housing defining a debris cavity and a filter cavity, as well as a bin filter, and a bin cover. More than one debris cavity may be provided, e.g., a swept debris cavity and a vacuumed debris cavity. If a cleaning treatment or fluid is applied, a cleaning bin may include a clean fluid dispensing portion. The debris cavity is configured to collect debris removed from a work surface by the cleaning head. The filter cavity is configured to collect debris removed from a work surface by a vacuum fan in fluid communication with the filter cavity. The bin filter is disposed in the filter cavity and is configured to substantially inhibit particulate from entering the vacuum fan. The bin cover is rotatably attached to the bin housing and configured to move between a bin closed position and a bin open position, exposing the filter cavity and the bin filter for servicing.

In one implementation, the cleaning bin also includes a bin cover spring actuator that biases the bin cover in the open position. When the cleaning bin is installed on the robot, the bin cover is held closed. When the cleaning bin is removed from the robot, the bin cover is actuated open by the spring exposing the filter cavity and the bin filter for servicing. The cleaning bin may also include a latch to hold the biased bin cover in the closed position, allowing a user to selectively open the bin cover.

In another implementation, the cleaning bin also includes for a modular ionic charged, washable, removable filter-plate in the filter cavity.

In one example, the cleaning head rotation includes brushes and the direction of rotation is reversed allowing the cleaning assembly to act as a surface (carpet) prep device. In this example, the bin carries a liquid or a powder (fresheners, etc) that is dispensed by the cleaning head onto the floor surface.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1A:
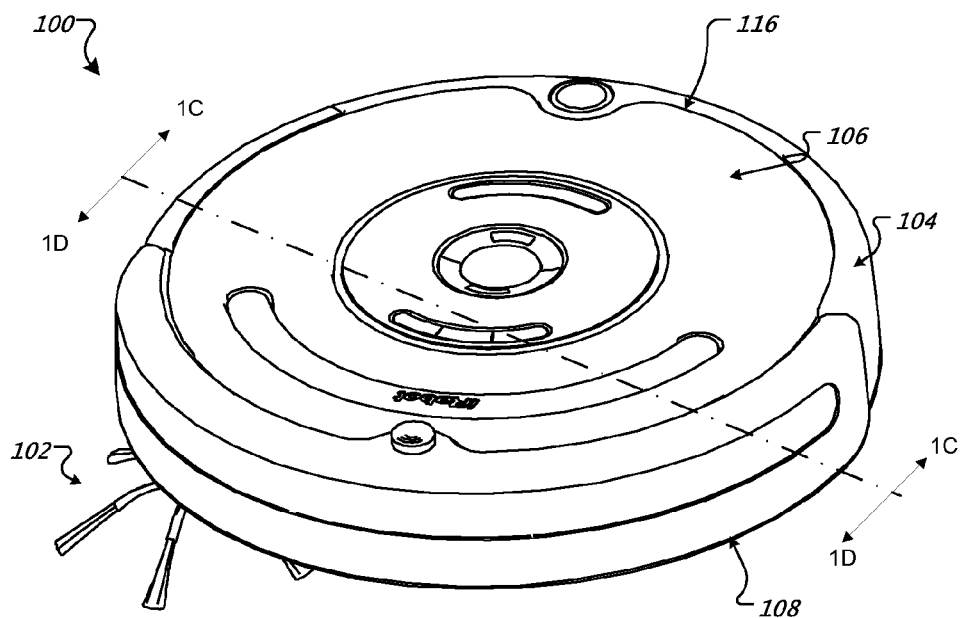
FIG. 1A is a top perspective view showing an example of a coverage robot.

FIG. 1A is a top perspective view showing an example of a coverage robot 100. The coverage robot 100 may be used to clean a work surface, such as a floor or wall by vacuuming debris brushed from the work surface. Coverage robot 100 includes modular components that are separately and independently removable from the coverage robot 100. A coverage robot is used for covering a surface. This includes cleaning as well as polishing, painting, resurfacing, sweeping, sterilizing, applying treatments, and more.

The top view of the coverage robot 100 shows a removable cleaning assembly 102, a removable top cover 104, a removable decorative cover 106, and a removable bumper 108. In one implementation, the cleaning assembly 102 moves debris on the work surface to a suction path under the coverage robot 100. The top cover 104 covers internal components on the top side of the coverage robot 100. The decorative cover 106 is used to change the appearance or style of the coverage robot 100, such as with colors or themes. The decorative cover 106 may also or alternatively be a functional panel or plate that carries sensors, interfaces, actuators, and the like (e.g., the cover 106 may be provided with some or all of its own microprocessor, mounted sensors, mounted actuators, and/or a plug interface to the robot itself). Different decorative covers 106 or different functional covers (not shown) may be interchangeably mounted as modules if they have the same outer shape, e.g., outer wall configuration matching a shaped cover-receiving cavity or recess in the robot 100. The bumper 108 protects the coverage robot 100 and objects the coverage robot 100 comes in contact with during the contact.

Modular components, such as the cleaning assembly 102, the top cover 104, the decorative cover 106, and the bumper 108, are arranged to be mountable into mating shaped receiving cavities and may be separately and independently removed from the coverage robot 100. For example, a broken or worn component may be removed and replaced with a properly functioning component or a malfunctioning component may be fixed and used again. In an alternative example, a component, such as the decorative cover 106, may be replaced to change the style or appearance of the coverage robot 100. In another example, a component may be replaced to change the function of the coverage robot 100, such as by replacing stiff brushes in the cleaning assembly 102 with soft brushes.

Figure 1B:
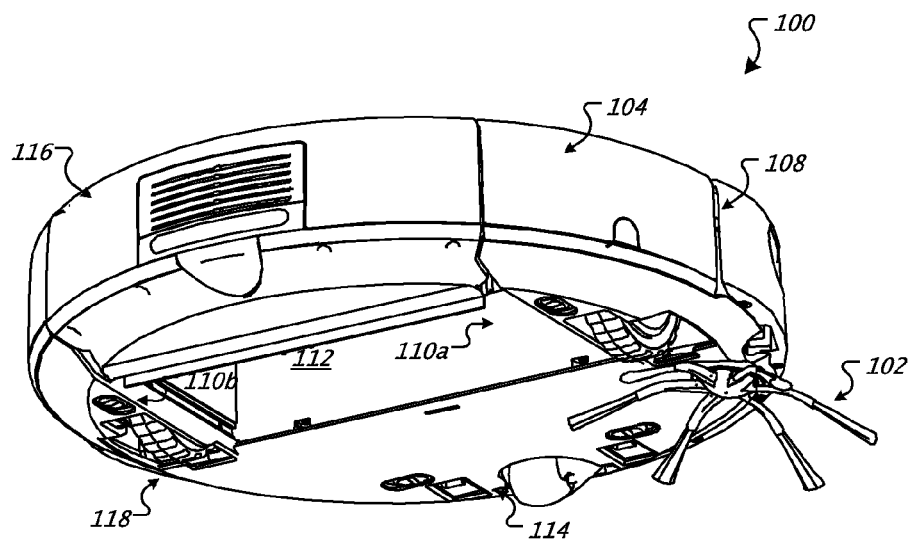
FIG. 1B is a bottom perspective view showing an example of a coverage robot.

FIG. 1B is a bottom perspective view showing an example of the coverage robot 100. The bottom view of the coverage robot 100 shows removable drive wheel assemblies 110a-b, a second removable cleaning assembly 112, a removable caster wheel assembly 114, a removable cleaning bin 116, and a removable bottom cover 118. The drive wheel assemblies 110a-b provide propulsion for the coverage robot 100. The second cleaning assembly 112 also moves debris on the work surface toward a suction path under the coverage robot 100. The caster wheel assembly 114 provides a third point of contact with the work surface. The cleaning bin 116 stores debris that the coverage robot 100 vacuums from the work surface. The bottom cover 118 helps secure shaped modules, such as the cleaning assemblies 102 and 112, the drive wheel assemblies 110a-b, and the caster wheel assembly 114 in the coverage robot 100.

Figure 1C:
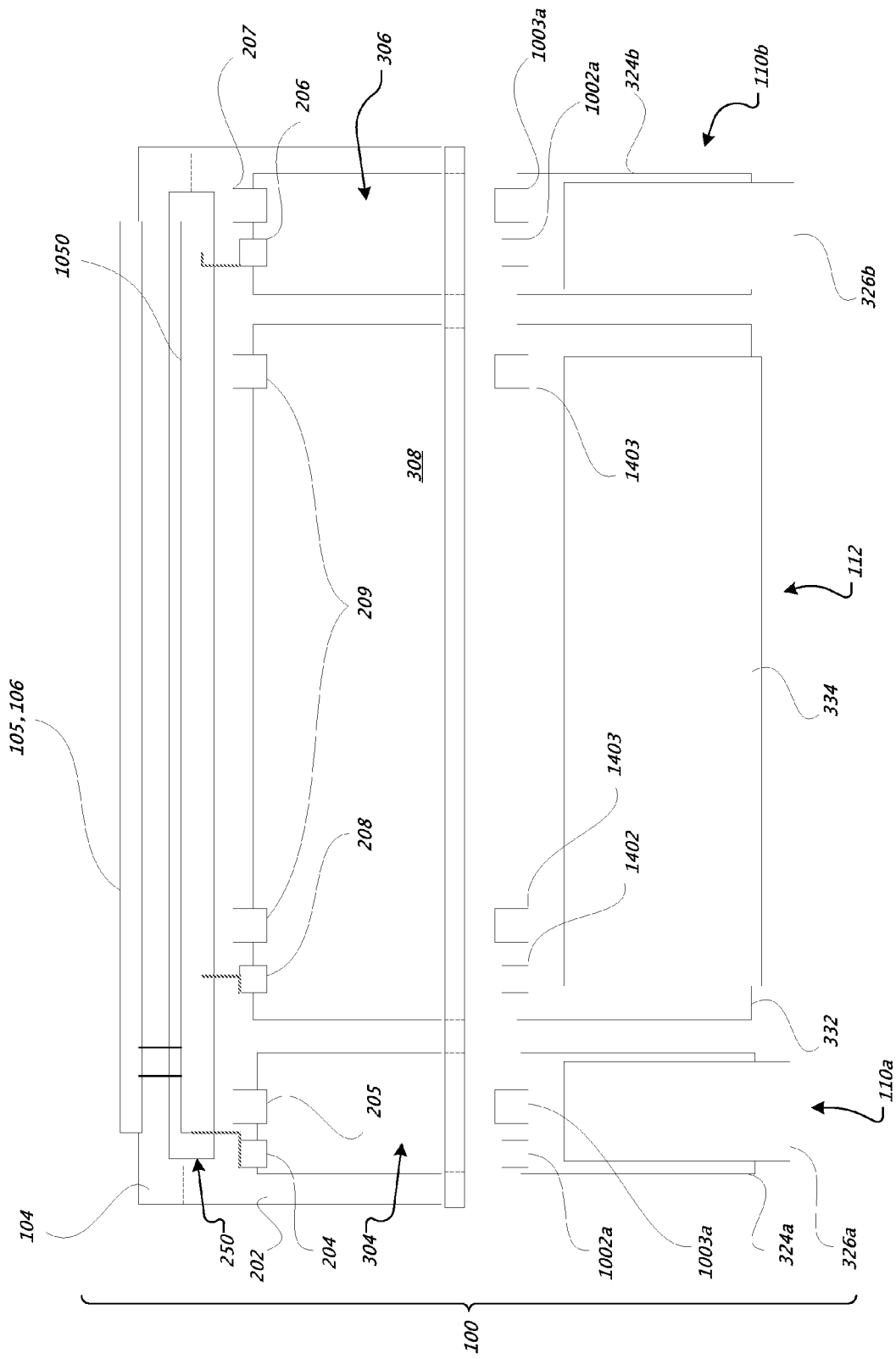
FIG. 1C is a sectional view showing an example of a coverage robot.
Figure 1D:
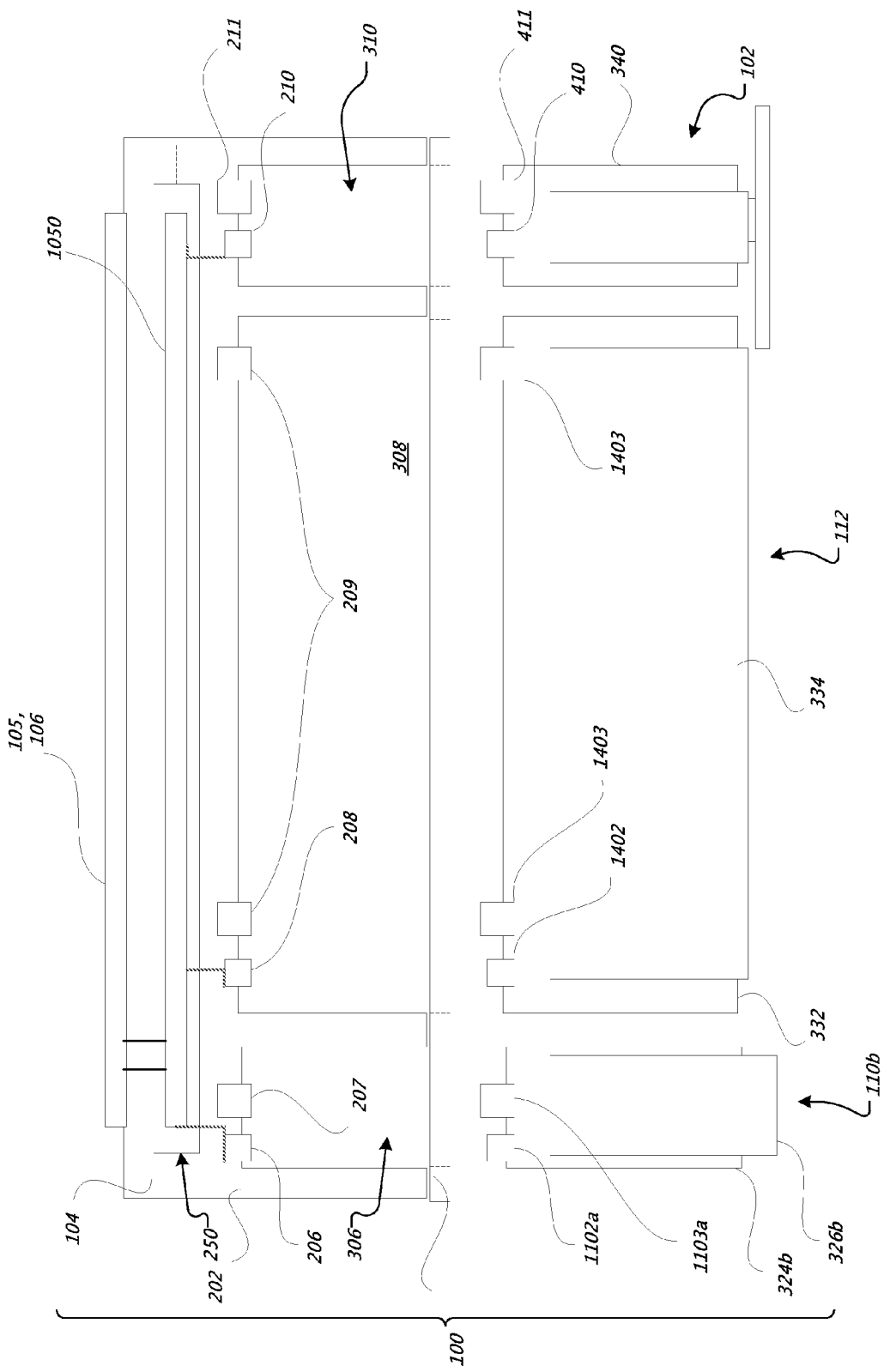
FIG. 1D is a sectional view showing an example of a coverage robot.

Referring to FIGS. 1C and 1D, shaped modules (e.g., modules 110, 112, 110b, 102 shown in schematic form) may be provided with mechanical connectors (e.g., for accepting a fastener, or that is itself a fastener) 1003a, 1403, 411 as well as electrical connectors 1002a, 1402, 410. The mechanical connectors on the shaped modules align with corresponding connectors, fixtures or hardpoints 205, 209, 211 formed in the robot chassis 202, and the electrical connectors on the shaped modules simultaneously align with mating connectors 204, 208, 206, 210 formed in the robot chassis 202, when a shaped module is e.g., slid into its mating shaped receiving cavity. This allows the modules to be securely mounted, and the power connectors to provide power to each module.

Figure 1E:
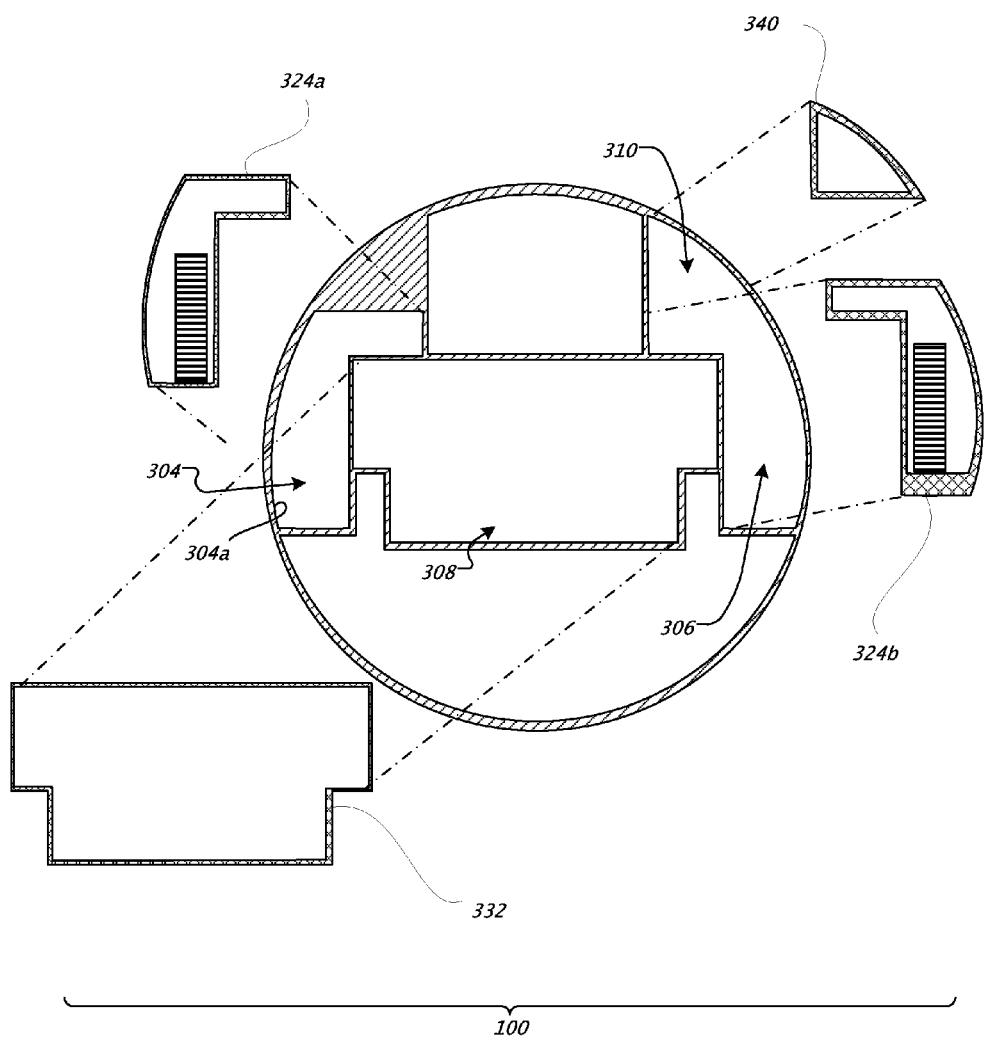
FIG. 1E is a cross-sectional view showing shaped cavities, mating modules, and parallel outer walls of a coverage robot.
Figure 1F:
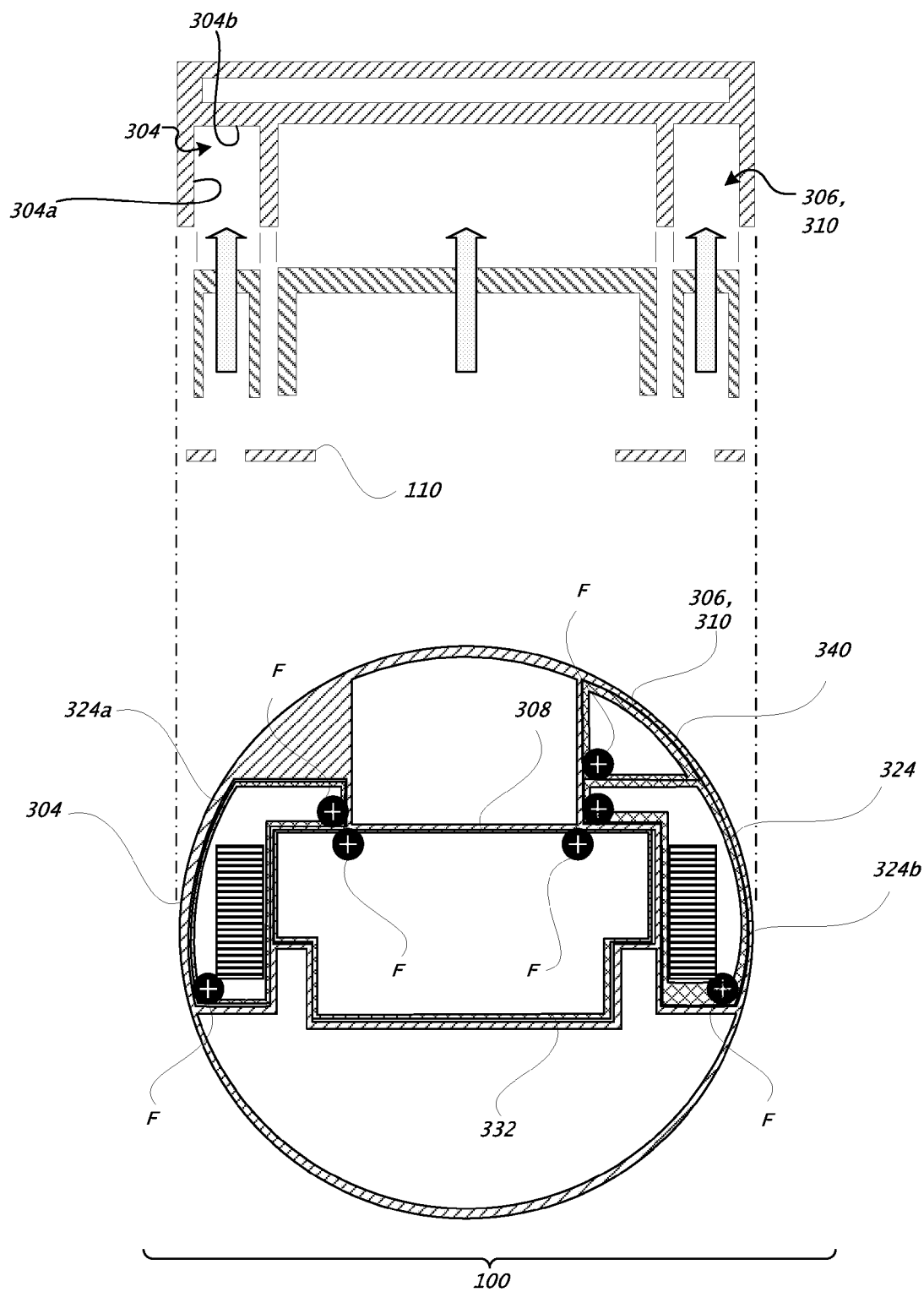
FIG. 1F is a cross-sectional view showing shaped cavities, mating modules, and parallel outer walls of a coverage robot.

Referring to FIGS. 1E and 1F, the chassis 202 is formed as a unibody structure, including downward-facing shaped receptacle cavities. In FIG. 1E, shaped receptacle 304, which matches the wheel module 110a housing, shaped receptacle 306/310, which matches the wheel module 110b housing and side brush module 340 housing and working head shaped receptacle 308, which matches the working head module housing 332, are shown. Each shaped receptacle is an irregular cup, having a plug in or on the bottom wall of the cup, a perimeter of parallel walls in the shape of the modules to be accepted, and an open side facing the bottom cover 110. As an example, parallel walls 304a and bottom wall 304b are illustrated in FIGS. 1E and 1F, although each of the shaped receptacles may have similar features. As illustrated in schematic form, the bottom of the robot 100 includes several modules. The parallel walls of the shaped receptacles and the matching parallel walls of the matching modules are a tight slip fit (if the module is to form part of the structural monocoque of the body) and a loose slip fit (if the module is to be quiet but will not significantly contribute to the rigidity of the mobile robot). As parallel walls, they permit the module to be directly slipped into the receiving shaped receptacle "cup" along the walls to the bottom (where, as discussed herein, an electrical connector to plug in the same straight direction is received by a plug at the bottom or side of the receptacle). As shown in FIGS. 1E and 1F, two neighboring shaped receptacles may share a wall (e.g., as the working head receptacle 308 shares walls with the wheel module receptacles 304, 306); and a single receptacle may receive more than one module, so long as those modules also have parallel walls where they abut one another (e.g., as the wheel module receptacle 306 and side brush module receptacle 310 are interconnected, and the wheel module wall or housing 324a and brush module housing 340 have an abutting parallel wall where the receptacles interconnect (or, e.g., form a single receptacle). As illustrated in schematic form in FIG. 1E, the modules are slid into place in the "vertical" (e.g., parallel wall) direction until they reach the bottom of their matching receptacle. As further illustrated, the modules may each be secured in their corresponding receptacle(s) by fasteners F, which are fastened in the same direction as the direction of insertion, permitting direct access when the cover 110 is removed. As noted herein, the cover 110 is preferably tool-less, having snaps, catches, sliders, or the like to secure it to the chassis, and when the cover 110 is removed, most of the modules are visible and any fasteners may be removed to permit the module to be slid out.

Figure 2A:
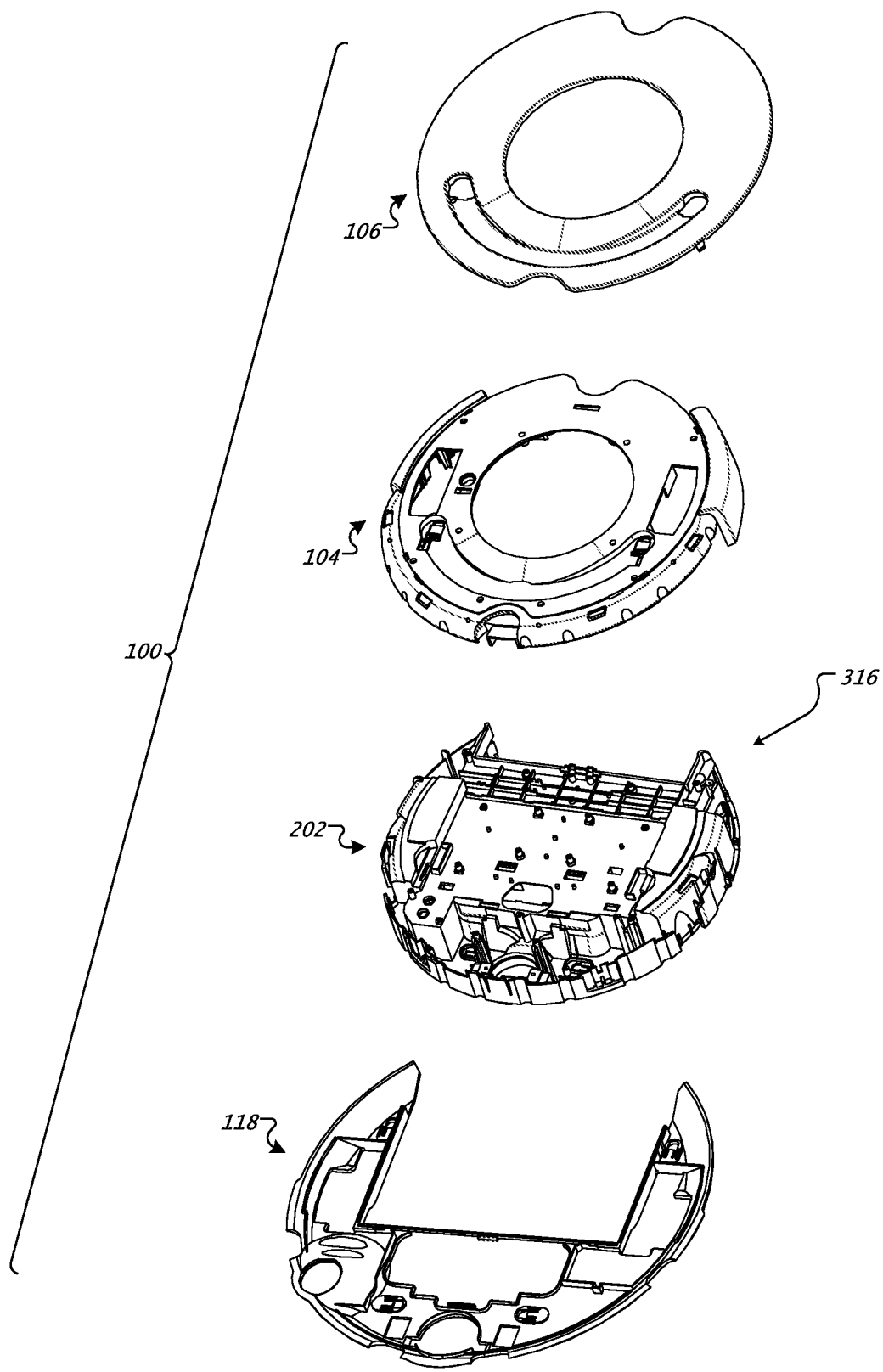
FIGS. 2A and 2B are exploded views showing examples of a chassis, a functional core cover, a top panel, and a retaining cover of a coverage robot.
Figure 2B:
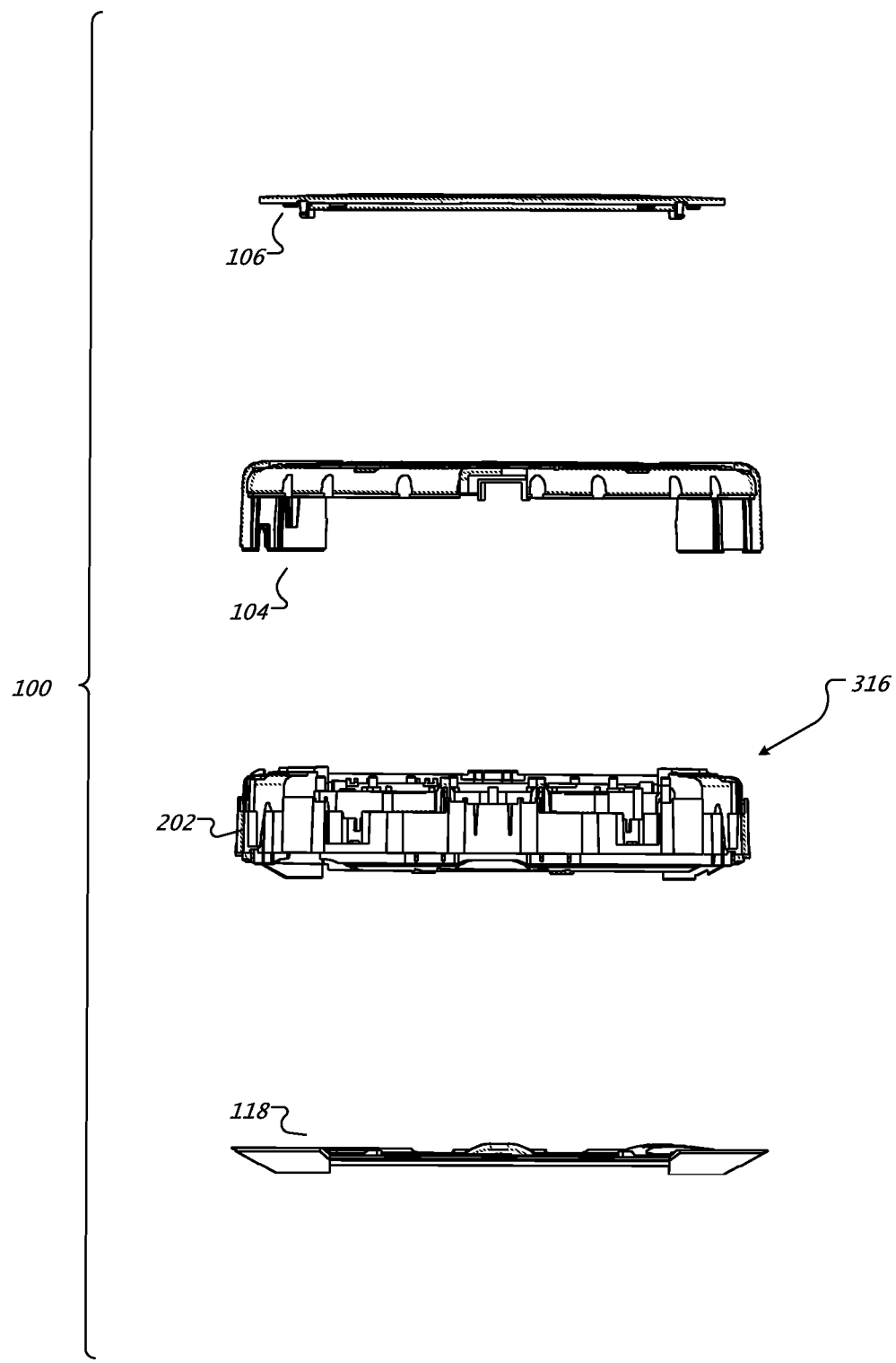
Figure 3:
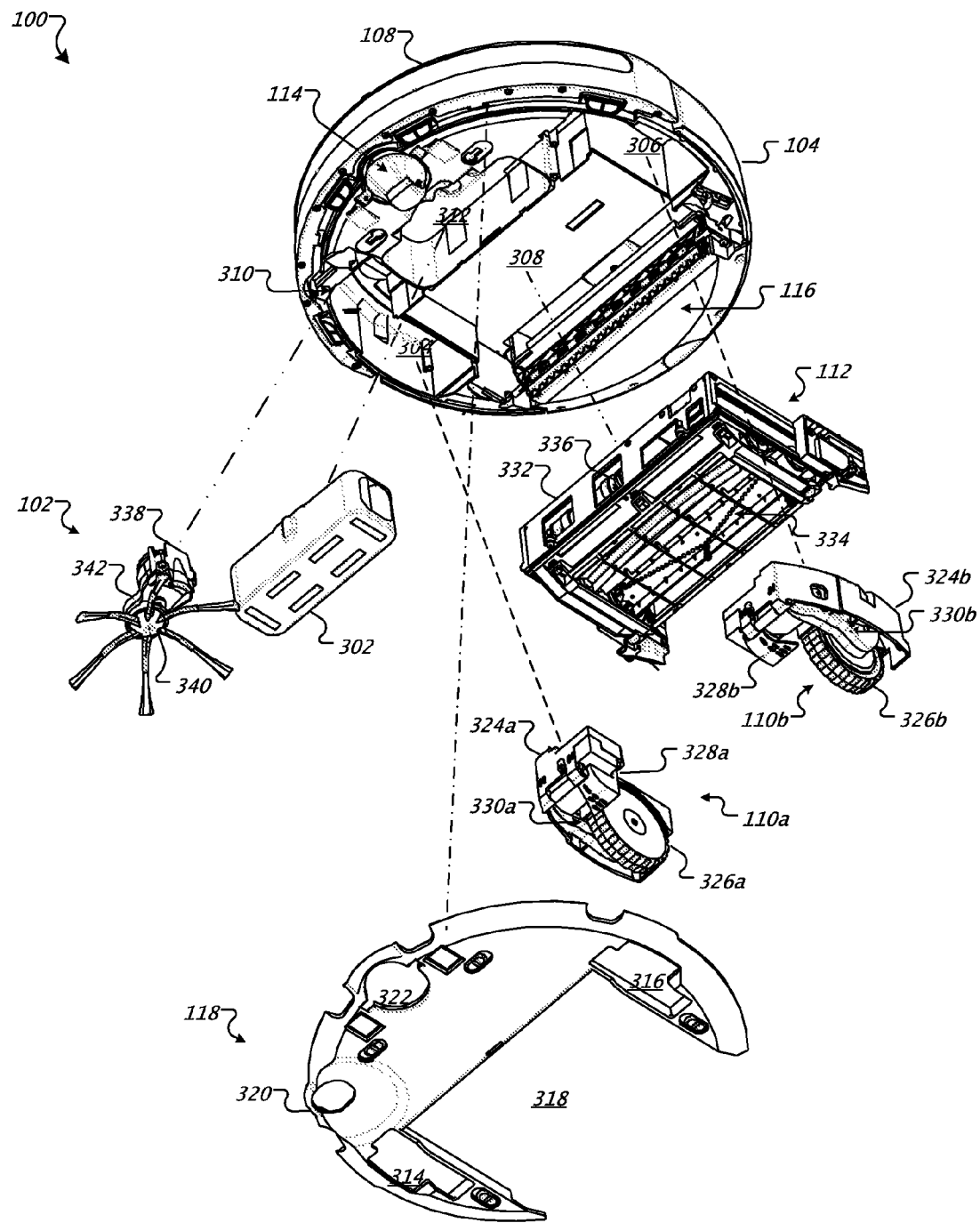
FIG. 3 is an exploded view showing an example of cleaning assemblies, drive wheel assemblies, a battery, and a bottom cover of a coverage robot.

FIGS. 2A-B provide exploded views showing an example of a chassis 202, a functional shell 104, and the covers 106, and 118 of the coverage robot 100. The chassis 202 carries the cleaning assemblies 102 and 112, the drive wheel assemblies 110a-b, and the caster wheel assembly 114 as well as other components of the coverage robot 100. The chassis 202 includes receptacles where the components are secured by the bottom cover 118. In one implementation, the chassis 202 is a unibody construction that defines each receptacle for each module and includes points of contact for parts. In this regard, as noted, the chassis 202 may be formed by wholly or partially unibody or monocoque techniques, in which structural load is supported using the chassis's external skin ("structural skin"). The chassis 202 and top functional shell 104 may enclose electronics such as controller board 1050 to be hermetically sealed or waterproofed and may be rigidly secured together to form a two-part monocoque structural support. Modules as discussed herein may be supported by the structural skin, but may also be formed as members of the monocoque, and/or may have an outer monocoque themselves permitting a module slid into its shaped receiving cavity and secured to contribute to the structural rigidity of the robot. On the other hand, the covers 106 and 118 would not generally contribute significantly to the structural rigidity of the robot (although each could be modified to do so). FIG. 3 is an exploded view showing an example of the cleaning assemblies 102 and 112, the drive wheel assemblies 110a-b, an electric battery 302, and the bottom cover 118 of the coverage robot 100. The bottom cover 118 retains the battery 302, acts as a barrier to prevent infiltration of foreign matter into the robot 100, and provides an insulating barrier for hot surfaces. Referring to FIGS. 1C-F and FIG. 3, the chassis 202 defines shaped receiving receptacles 304, 306, 308, 310, and 312 where the drive wheel assembly 110a, the drive wheel assembly 110b, the cleaning assembly 112, the cleaning assembly 102, and the electric battery 302 are received (by sliding parallel walls of the module into the parallel walls of the mating shaped receiving receptacle) and secured by the bottom cover 118, respectively. The bottom cover 118 includes openings 314, 316, 318, 320, and 322 that are e.g., smaller than downward-facing openings of corresponding shaped receiving receptacles to allow the drive wheel assembly 110a, the drive wheel assembly 110b, the cleaning assembly 112, the cleaning assembly 102, and the caster wheel assembly 102, respectively, to act through the bottom cover, and in some cases, to come in contact with the work surface.

The modularity of the bottom cover 118 allows the robot 100 to be altered to accommodate different floor surfaces. The bottom cover 118 may be disposed on the chassis 202 at various cover heights with respect to a floor to accommodate different floor types. For high pile shag carpets, the bottom cover 118 may be coated with Teflon and the cover height reduced, to allow the robot 100 to skim (float) on the deep carpet with ease. Where the floor surface is primarily hard flooring, a replaceable bottom covers 118 with mustache brushes disposed on a forward portion of the bottom cover 118 may be used to channel fine dirt towards the cleaning assembly 112. Additional mustache brushes disposed on a rearward portion of the bottom cover 118 may be used to minimize air born dust from escaping the cleaning assembly 112. When using the robot 100 to clean surfaces with many drop-offs (ledges/stairs), the bottom cover 118 may be fitted with skid pads that act as a braking system to prevent the robot 100 from falling or sliding off the ledges. In another implementation, a UV light module that works in close proximity to the floor to sanitize floors is disposed below the bottom cover 118, which is fitted with electric terminals to contact the power contacts of one of the cleaning assemblies 102 or 112. In yet another implementation, the bottom cover 118 is fitted with sand-paper flaps for prepping a factory/lab floor in need of abrasive floor cleaning before a paint layer can be applied.

The drive wheel assembly module 110a-b includes drive wheel assembly housings 324a-b, wheels 326a-b, wheel drive motors 328a-b, and linkages 330a-b, respectively. The wheels 326a-b are rotatably coupled to the drive wheel assembly housings 324a-b. In addition, the drive wheel assembly housings 324a-b carry the wheel drive motors 328a-b, respectively. The wheel drive motors 328a-b are operable to drive the wheels 326a-b, respectively. The linkages 330a-b attach the drive wheel assemblies 110a-b, respectively, to the chassis 202 at a location forward of the wheels 326a-b, respectively. The linkages 330a-b suspend the wheels 326a-b, respectively, from the chassis 202. The linkages 330a-b rotate at the connection to the chassis 202 to allow the wheels 326a-b, respectively, to move up and down.

The main cleaning assembly module 112 includes a cleaning assembly housing 332, a main brush 334, a secondary brush, and a cleaning drive motor 336. The main brush 334, the secondary brush, a pivoting frame, a wire cover or bail, and other elements moving together with the brushes to accommodate surface variations form a main cleaning head. The main brush 334 is rotatably coupled to the cleaning assembly housing 332 and rotates to brush and clean the work surface. The cleaning assembly housing 332 carries a cleaning drive motor 336. The cleaning drive motor 336 drives the main brush 334 and optionally a secondary brush. This main cleaning assembly module 112, as depicted, includes the main work head of the robot 100 (i.e., that works and covers an area as the robot moves forward), and the main work head the main work width of the robot 100.

The lateral or side cleaning assembly module or head 102 includes a cleaning assembly housing 338, a side brush 340, and a cleaning drive motor 342. The side brush 340 is rotatably coupled to the cleaning assembly housing 338 and rotates to brush and clean the work surface, the side brush 340 extending beyond the perimeter of the robot to collect debris along walls and in corners and direct debris in front of the main brush 334, to be collected by the main brush. The cleaning assembly housing 338 carries the cleaning drive motor 342. The cleaning drive motor 342 drives the side brush 340.

The electric battery 302 provides power to components, such as the drive wheel assemblies 110a-b and the cleaning assemblies 102 and 112, via motor controllers and amplifiers. The drive wheel modules 110a-b and the cleaning modules 102 and 112 include power connectors that connect motor power and/or control to the wheel drive motors 328a-b and the cleaning drive motors 336 and 342, respectively. The power connectors are located on an outer surface of the drive wheel assembly housings 324a-b and the cleaning assembly housings 332 and 338. The power connectors mate with power connectors within the receptacles 304, 306, 308, 310, and 312 in the chassis 202.

Figure 4A:
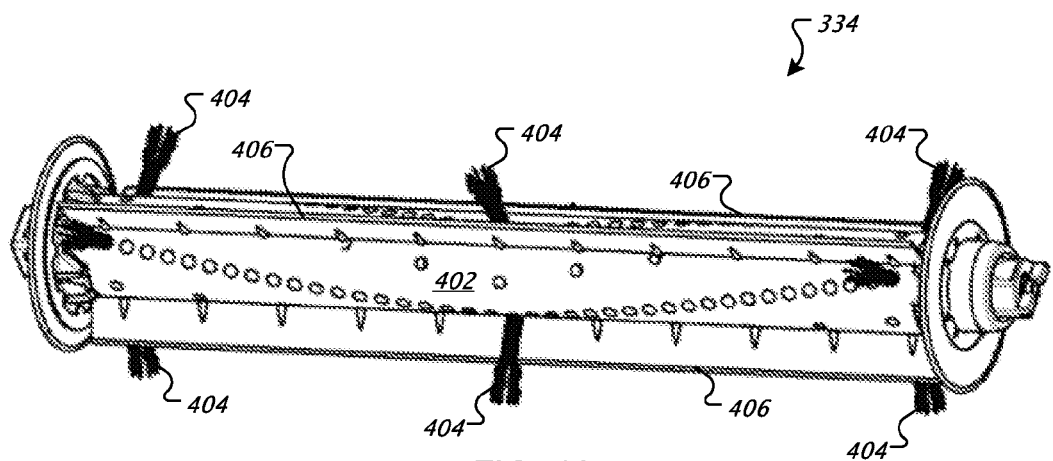
FIG. 4A is a perspective view showing an example of a horizontal cleaning head.

FIG. 4A is a perspective view showing an example of a main brush 334. The main brush 334 is separately and independently removable from the cleaning head within the cleaning assembly 112 and thereby from the coverage robot 100. The main brush 334, in this case, rotates about a horizontal axis parallel to the work surface, and is thereby a horizontal cleaning assembly although the main work width of a coverage robot may include vertically rotating brushes, no brushes in lieu of a vacuum, a reciprocating brush, a circulating belt member, and other known cleaning implements. The main brush 334 has a cylindrical body 402 that defines a longitudinal axis of rotation. Bristles 404 are attached radially to the cylindrical body 402. Flexible flaps 406 are attached longitudinally along the cylindrical body 402. As they rotate, the bristles 404 and the flexible flaps 406 move debris on the work surface, directing it toward a sweeper bin in the robot. In some cases, the main brush may also direct debris or dirt a suction path under the cleaning robot 100. In the case of a wet cleaning robot, the main brush may have instead a scrubbing function, and a vacuum or other collector may collect waste fluid after scrubbing.

Figure 4B:
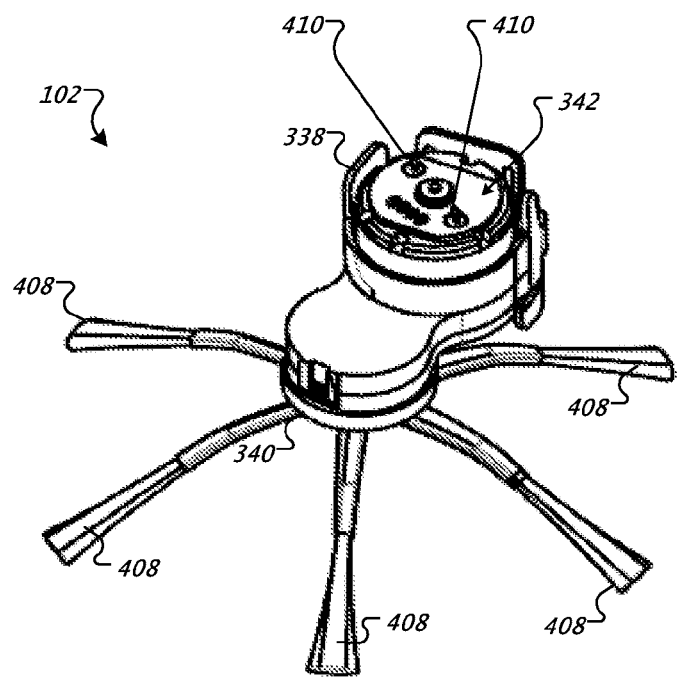
FIG. 4B is a perspective view showing an example of a vertical cleaning assembly.
Figure 4C:
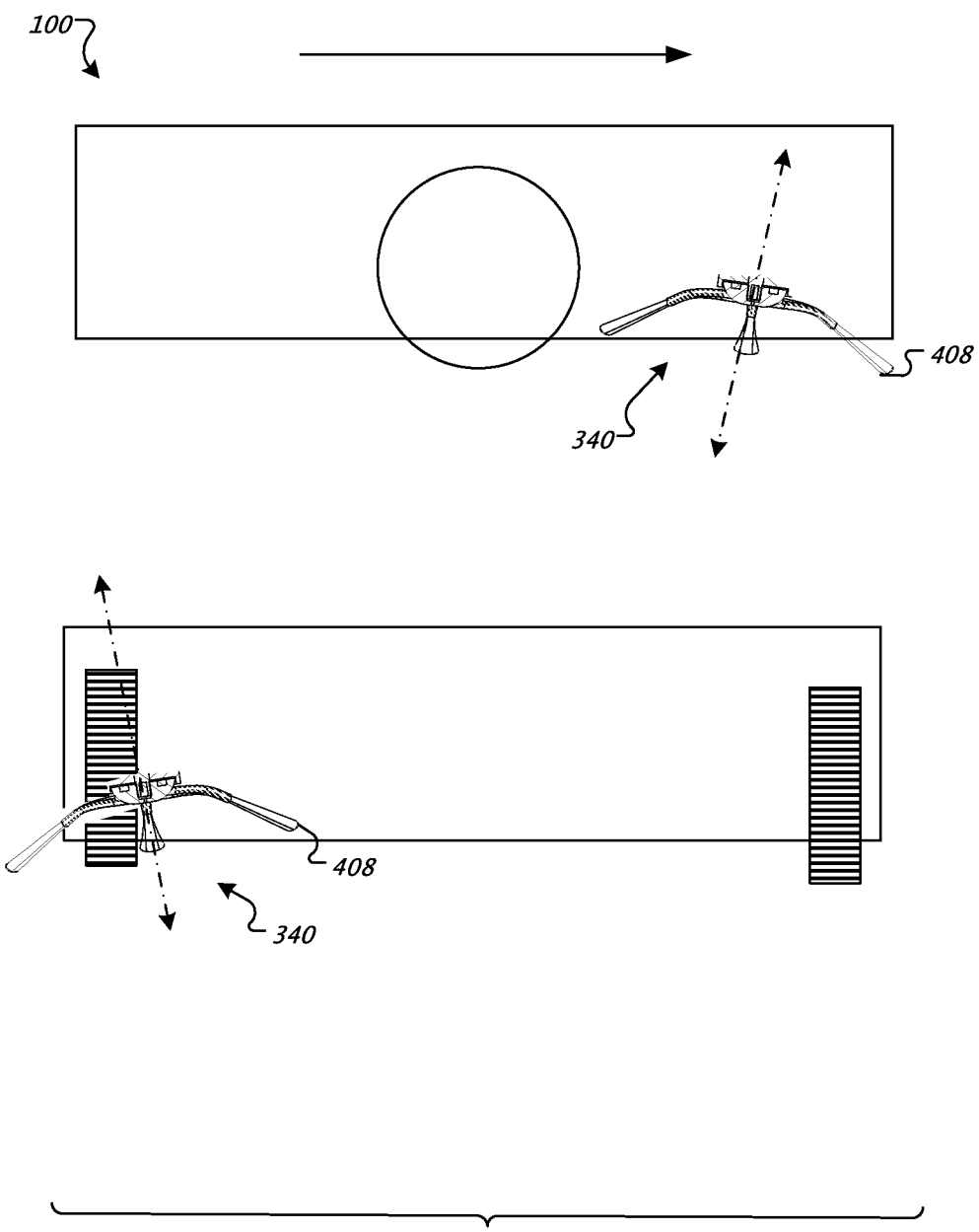
FIG. 4C is a schematic view showing an example of a vertical cleaning assembly.

FIG. 4B is a perspective view showing an example of the side cleaning assembly 102, which may be a vertical cleaning assembly. In certain implementations, the cleaning head 340 is separately and independently removable from the cleaning assembly 102 and the cleaning robot 100. The side cleaning brush 340 rotates about a vertical axis normal to the work surface. The cleaning brush 340 has brush elements 408 with a first end that attaches to the cleaning head 340 at the axis of rotation and a second end that radiates from the axis of rotation. In certain implementations, adjacent brush elements are evenly spaced about the axis of the cleaning head 340, such as a space of 120 degrees between three elements or 60 degrees between six elements. The brush elements 408 extend beyond a peripheral edge of the coverage robot 100 to move debris adjacent to the coverage robot 100 toward the suction path under the coverage robot 100. In some implementations, although the vertical cleaning assembly 102 is generally vertical, the cleaning head 340 operates about an axis offset (tilted) from a vertical axis of the vertical cleaning assembly 102. As shown in schematic form in FIG. 4C, the brush 340 may be tilted, in both forward and side to side directions (i.e., tilted downward with respect to the plane of wheel contact about a line about 45 degrees from the direction of travel within that plane), in order to collect debris from outside the robot's periphery toward the main work width, but not disturb such collected debris once it is there or otherwise eject debris from the work width of the robot. The axis offset is optionally adjustable to customize the tilt of the cleaning head 340 to suit various carpet types, such as shag.

Referring to FIGS. 4B and 1D, the side cleaning module 102 includes a power connector 410. When the cleaning assembly 102 is placed in the shaped receptacle 310 the power connector 410 mates with a power connector 210 in the receptacle 310 (as described, optionally having shaped parallel walls to guide the power connectors to mate). The mated power connector 410 provides power to the cleaning drive motor 342 from the electric battery 302. A mechanical hard point or fastener 411 on the side cleaning module 102 mates with a corresponding mechanical hard point 211 in the receptacle 310.

Figure 5:
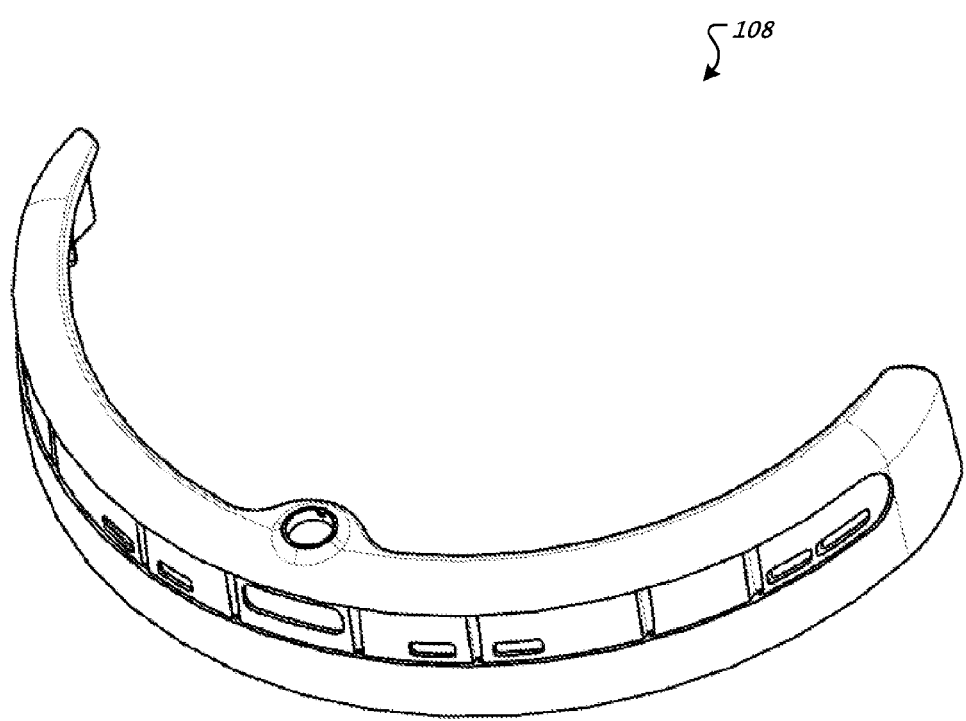
FIG. 5 is a perspective view showing an example of a coverage robot bumper.

FIG. 5 is a perspective view showing an example of the coverage robot bumper 108. The bumper 108 is attached to the coverage robot 100 at a forward portion of the chassis 202. The bumper 108 is separately and independently removable from the chassis 202 and the coverage robot 100. The bumper 108 protects the coverage robot 100 and one or more objects in the path of the coverage robot 100 during a collision with the one or more objects.

Figure 6:
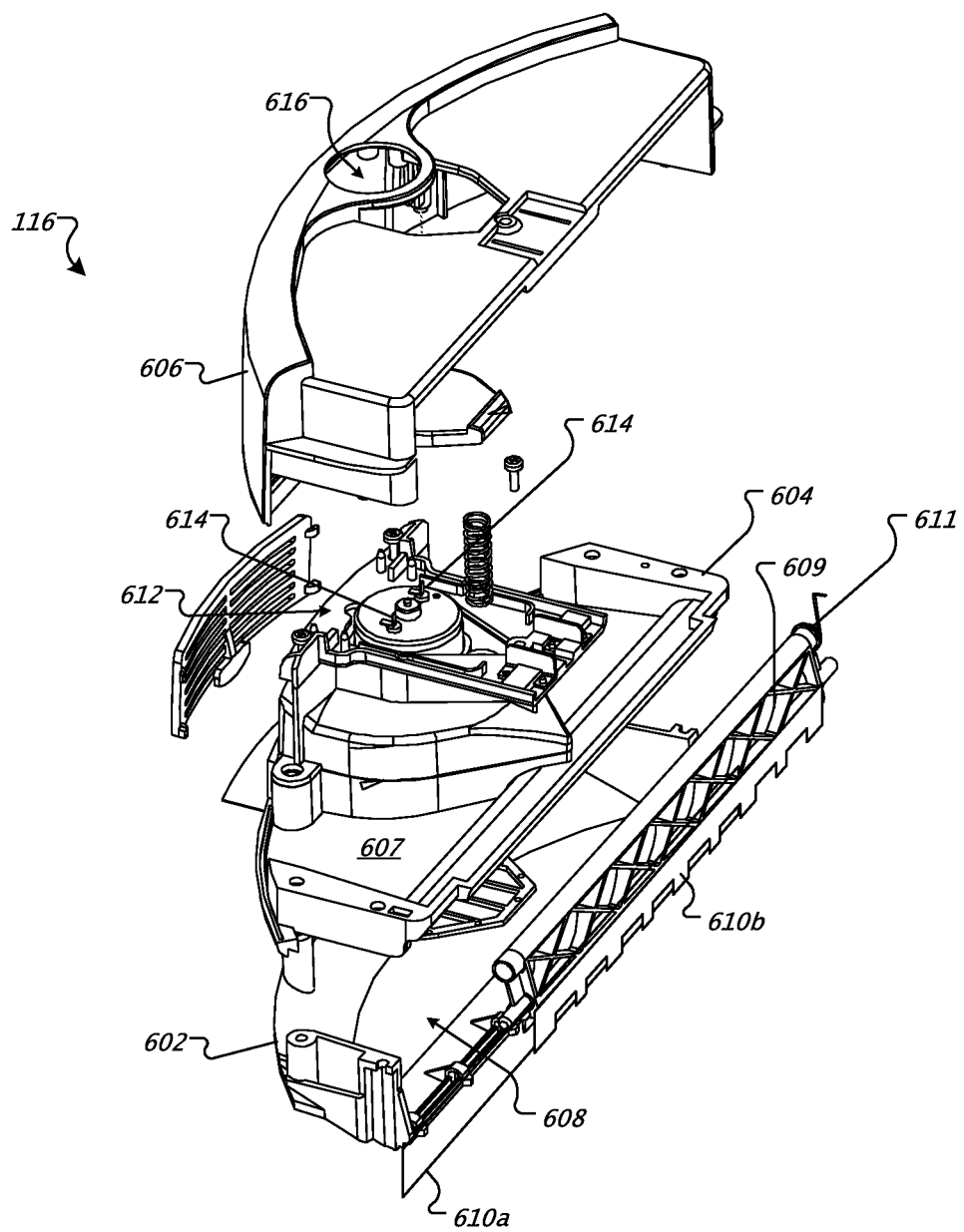
FIG. 6 is an exploded view showing an example of a cleaning bin.

FIG. 6 is an exploded view showing an example of the cleaning bin 116. The cleaning bin 116 includes a bottom housing 602, a middle housing 604, a top housing 606, a debris cavity 607, a filter cavity 608, a filter cavity cover 609, a debris squeegee 610, and a vacuum fan 612. Referring to FIG. 2, chassis 202 defines a bin receiving slot 316 where the cleaning bin 116 is housed.

Together, the top housing 606 and the middle housing 604 form a debris cavity 607. The debris cavity 607 has at least one opening at its forward side adjacent to the cleaning assembly 112. Through the opening(s), the debris cavity 607 may collect debris from the cleaning assembly 112.

Together, the bottom housing 602 and the middle housing 604 may also form a filter cavity 608 that stores debris vacuumed from the work surface. The debris squeegee 610 scrubs the work surface and directs debris into the debris cavity 608. The vacuum fan 612 is attached to the top side of the middle housing 604. The vacuum fan 612 creates a suction path from the work surface at the debris squeegee 610 and through the filter cavity 608. A filter below the vacuum fan 612 prevents debris from exiting the filter cavity 608 and entering the vacuum fan 612.

The filter cavity cover 609 is rotatably attached to the middle housing 604 and is configured to move between a closed position and an open position, which exposes the filter cavity 608 and a filter for servicing.

The cleaning bin 116 may also include a filter cavity cover spring actuator 611 that biases the filter cavity cover 609 in the open position. When the cleaning bin 116 is secured to the chassis 202 the filter cavity cover 609 is held in a closed position. When the filter cavity cover 609 is removed from the chassis 202, the filter cavity cover spring 611 rotates the filter cavity cover 609 open, exposing the filter cavity 608 for removal of debris. In one example, the cleaning bin 116 may also include a latch to hold the biased filter cavity cover 609 in the closed position, until a user releases the latch, thereby allowing the filter cavity cover spring 611 to rotate the cover open.

The vacuum fan 612 includes a power connector 614. The power connector 614 provides power to the vacuum fan 612 from the electric battery 302. The power connector 614 protrudes through an opening 616 in the top housing 606. This allows the power connector 614 to mate with a power connector in the chassis 202 when the cleaning bin 116 is placed in a receptacle within the chassis 202.

Figure 7A:
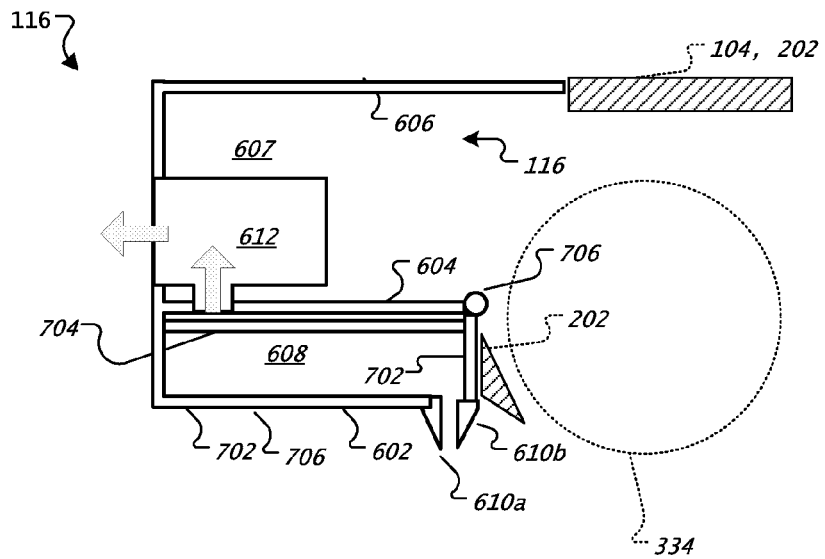
FIGS. 7A-B are cross-sectional views showing examples of cleaning bins including cleaning bin covers.
Figure 7B:
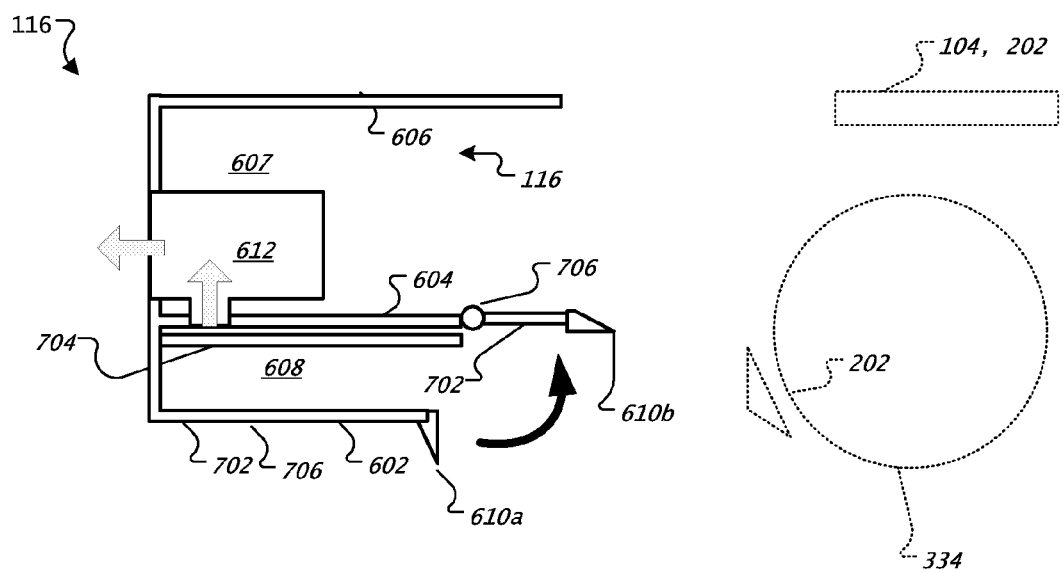

FIGS. 7A-B are cross-sectional views showing examples of the cleaning bin 116 including cleaning bin covers. FIG. 7A shows an example of the cleaning bin 116 having a cleaning bin cover 702 hinged at the bin housing 606. The bin cover 702 enclose a robot side of the filter bin 116. The bin cover 702 may be opened to empty the cleaning bin 116, and in particular, the debris the filter cavity 608. A bin filter 704 below the vacuum fan 612 retains debris vacuumed into the filter cavity 608 along the suction path. The bin covers 702 may have attached springs 706 or another device that bias the bin covers 702 in an open position.

In certain implementations, the bin covers 702 open as the cleaning bin 116 is removed from the coverage robot 100 (as shown in FIGS. 7A, 7B).

Alternatively, the bin cover 702 may open when a bin cover latch is released. The latch retains the bin cover 702 in a closed position, such as during operation of the coverage robot 100. The latch may be released to open the bin cover 702 and empty the cleaning bin 116.

Figure 8:
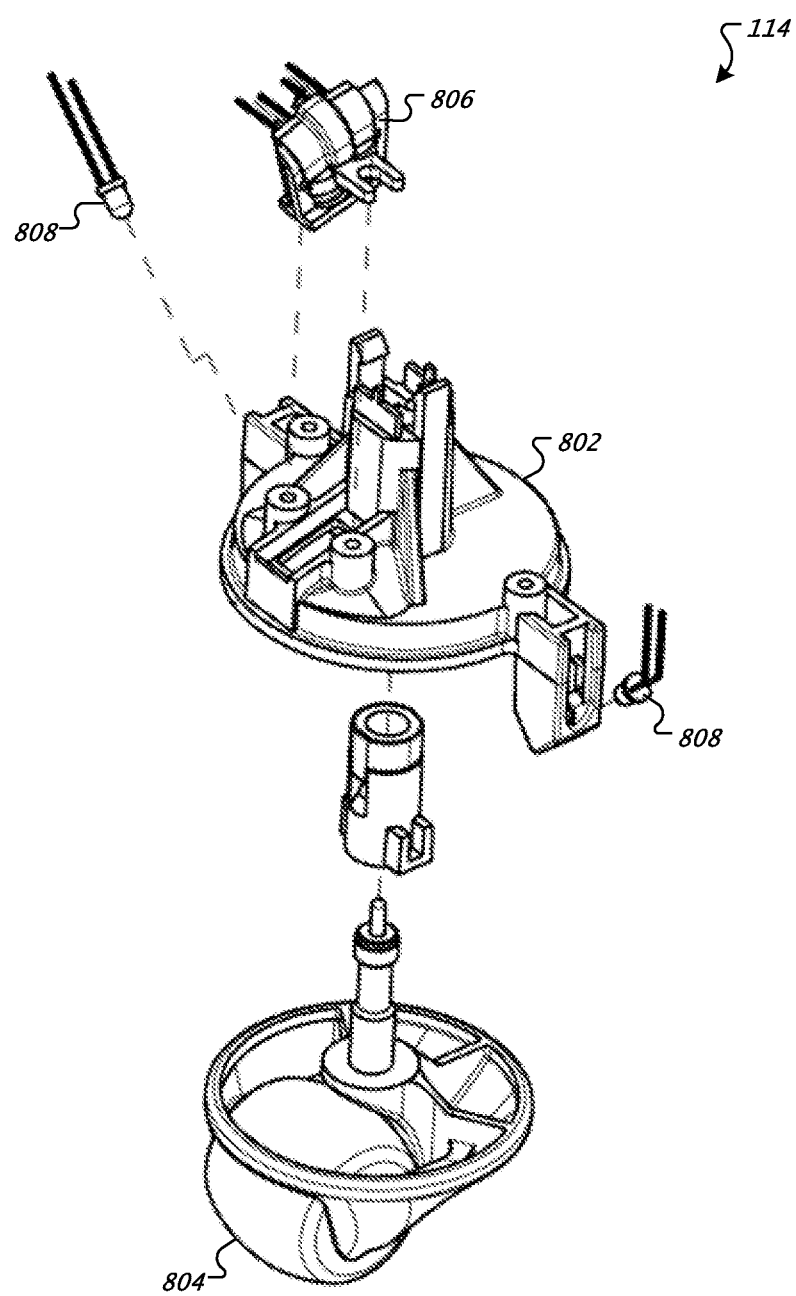
FIG. 8 is an exploded view showing an example of a caster wheel assembly.

FIG. 8 is an exploded view showing an example of the caster wheel assembly 114. The caster wheel assembly 114 is separately and independently removable from the chassis 202 and the coverage robot 100. The caster wheel assembly 114 includes a caster wheel housing 802, a caster wheel 804, a wheel-drop sensor 806, and a wheel-floor proximity sensor 808.

The caster wheel housing 804 carries the caster wheel 802, the wheel drop sensor 806, and wheel-floor proximity sensor 808. The caster wheel 804 turns about a vertical axis and rolls about a horizontal axis in the caster wheel housing 802.

The wheel drop sensor 806 detects downward displacement of the caster wheel 804 with respect to the chassis 202. The wheel drop sensor 806 determines if the caster wheel 804 is in contact with the work surface.

The wheel-floor proximity sensor 808 is housed adjacent to the caster wheel 804. The wheel-floor proximity sensor 808 detects the proximity of the floor relative to the chassis 202. The wheel-floor proximity sensor 808 includes an infrared (IR) emitter and an IR receiver. The IR emitter produces an IR signal. The IR signal reflects off of the work surface. The IR receiver detects the reflected IR signal and determines the proximity of the work surface. Alternatively, the wheel-floor proximity sensor 808 may use another type of sensor, such as a visible light sensor. The wheel-floor proximity sensor 808 prevents the coverage robot 100 from moving down a cliff in the work surface, such as a stair step or a ledge. In certain implementations, the drive wheel assemblies 110a-b each include a wheel-floor proximity sensor.

Figure 9A:
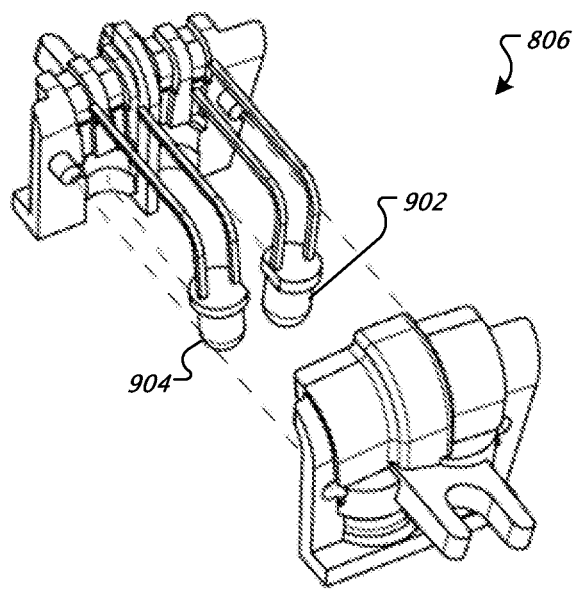
FIG. 9A is an exploded view showing an example of a wheel-drop sensor.

FIG. 9A is an exploded view showing an example of the wheel-drop sensor 806. The wheel drop sensor 806 includes an IR emitter 902 and an IR receiver 904. The IR emitter 902 produces an IR signal. The IR signal reflects from the caster wheel 804. The IR receiver 904 detects the reflected IR signal and determines the vertical position of the caster wheel 804.

Figure 9B:
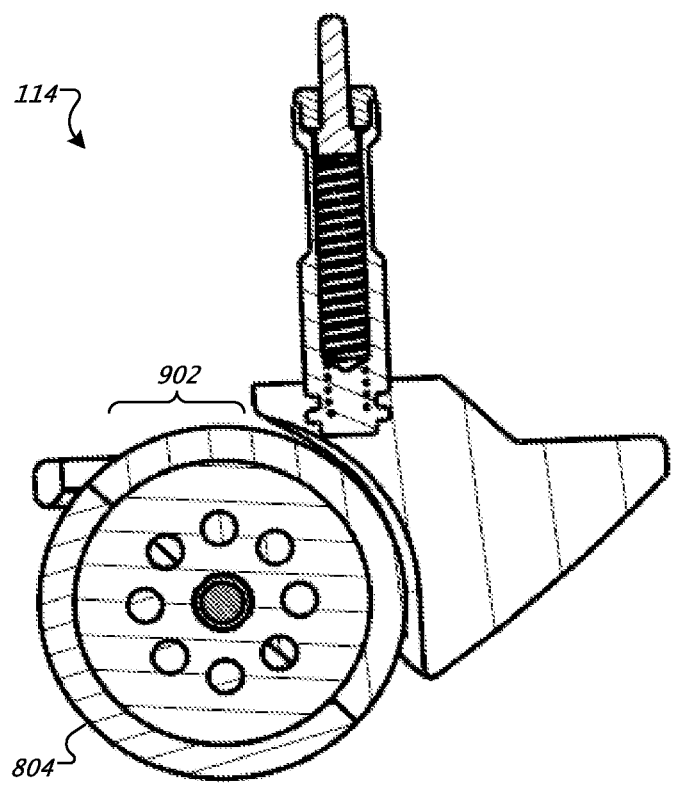
FIG. 9B is a cross-sectional view showing an example of a caster wheel assembly.

FIG. 9B is a cross-sectional view showing an example of the caster wheel assembly 114. The view shows a top surface 906 of the caster wheel 804 from which the IR signal reflects. The IR receiver 904 uses the reflected IR signal to determine the vertical position of the caster wheel 804.

Figure 10A:
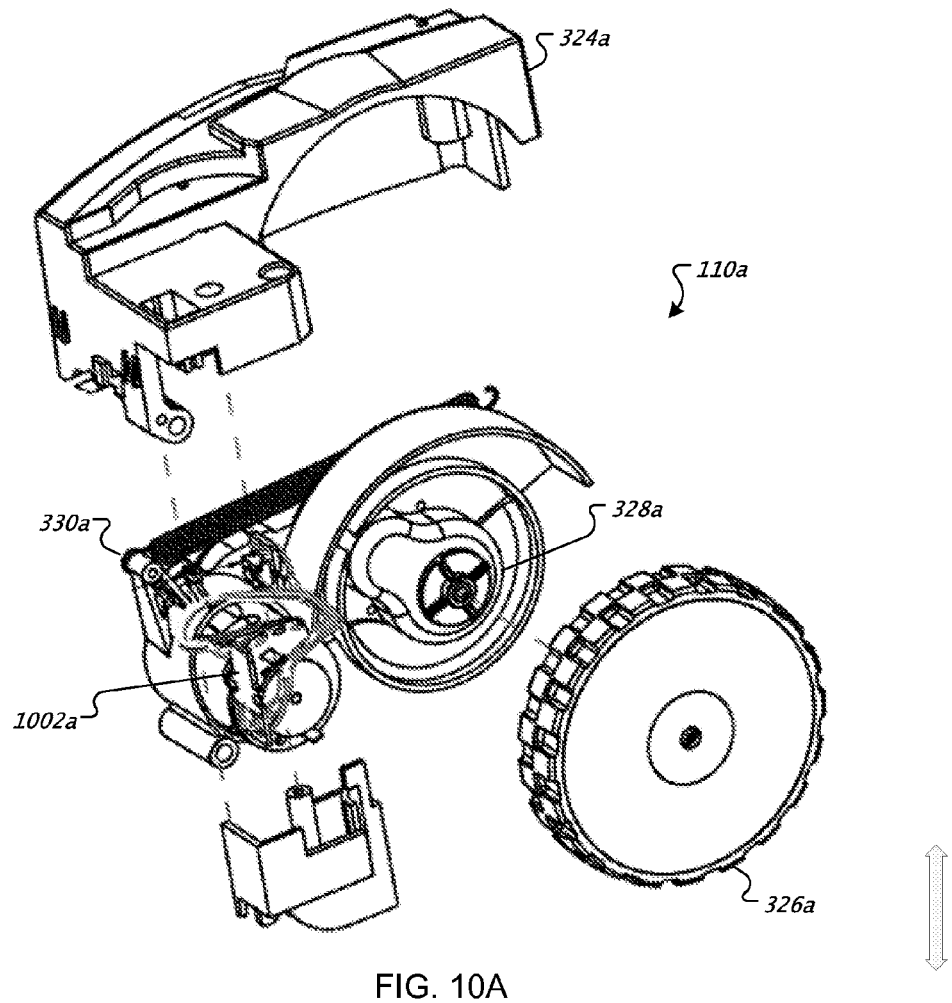
FIG. 10A is an exploded view from a top perspective showing an example of a drive wheel assembly.
Figure 10B:
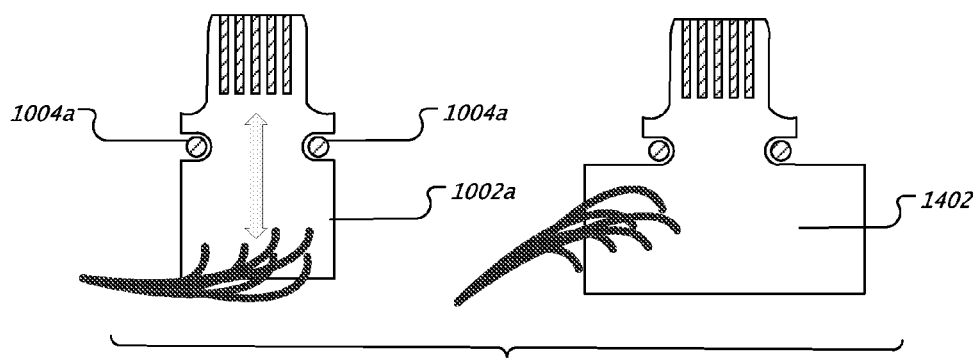
FIG. 10B is a front view of a power connector.
Figure 11:
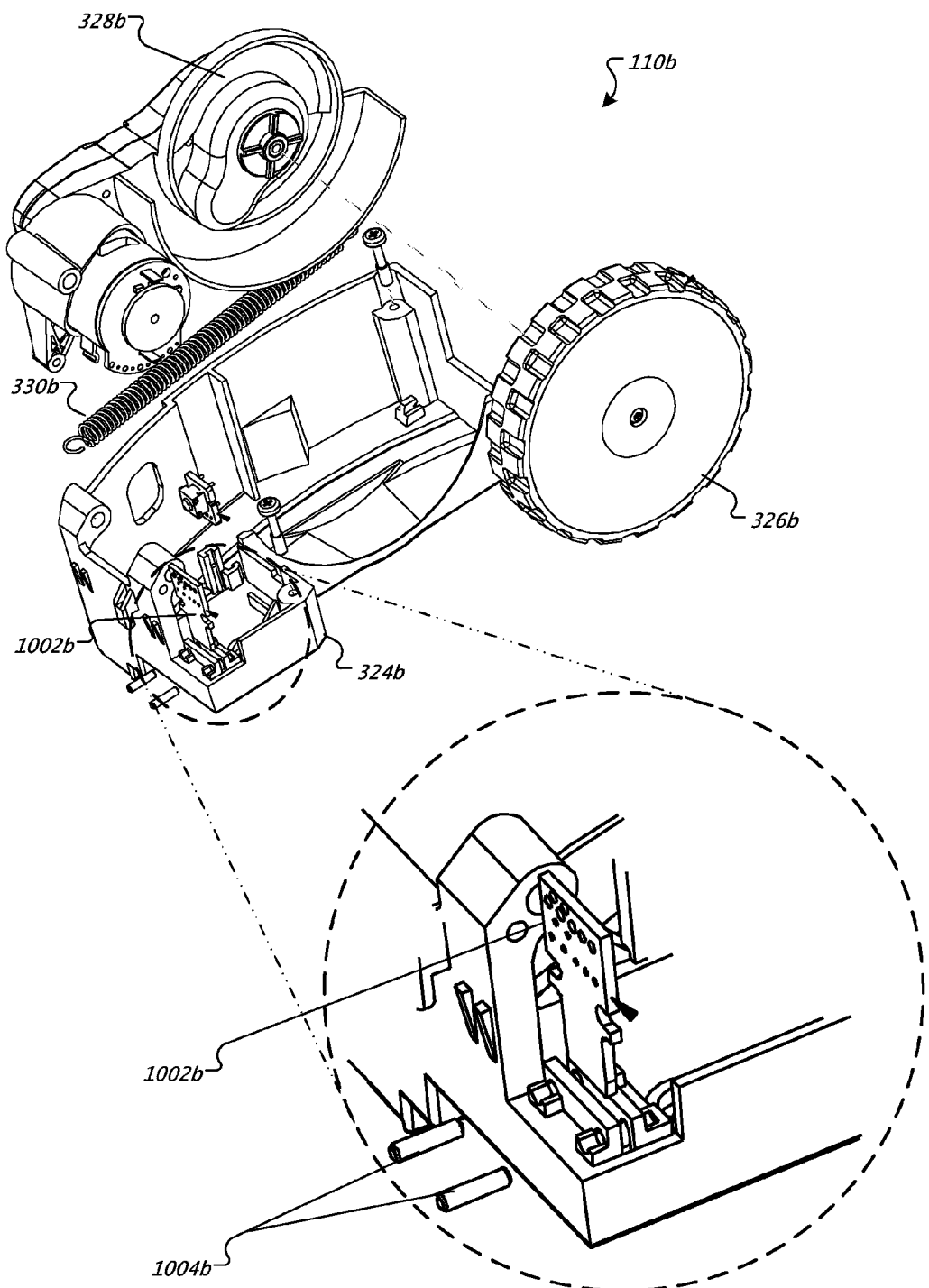
FIG. 11 is an exploded view from a bottom perspective showing an example of a drive wheel assembly.

FIG. 10A is an exploded view from a top perspective showing an example of the drive wheel assembly 110a. The view shows the drive wheel assembly housing 324a, the wheel drive motor 328a, the linkage 330a, the wheel 326a, and the power connector 1002. FIG. 11 is an exploded view from a bottom perspective showing an example of the drive wheel assembly 110b. The view shows the drive wheel assembly housing 324b, the wheel drive motor 328b, the linkage 330b, the wheel 326b and the power connector 1002b.

Referring to FIGS. 10A-B, 11, and 1C, the drive wheel assembly 110a also includes a power connector 1002. When the drive wheel assembly 110a is placed in the receptacle 304, the power connector 1002a mates with a power connector 204 in the receptacle 304. This allows the power connector 1002a to provide power to the wheel drive motor 328a from the electric battery 302. A mechanical hard point 1003a on the drive wheel assembly 110a mates with a corresponding mechanical hard point 205 in the receptacle 304. The power connector 1002a on the drive wheel assembly 110a is a floating connector (edge card) mounted to the module housing 324a with pins/screws 1004 with a clearance between the pins 1004, power connector 1002a, and the walls of the module housing 324a. The limited free-float design allows the power connector 1002a to move a small amount when the locating features, such as the mechanical hard point 1003a, in the module are engaged, thereby minimizing stress on the connector-set during assembly and in operation.

Figure 12:
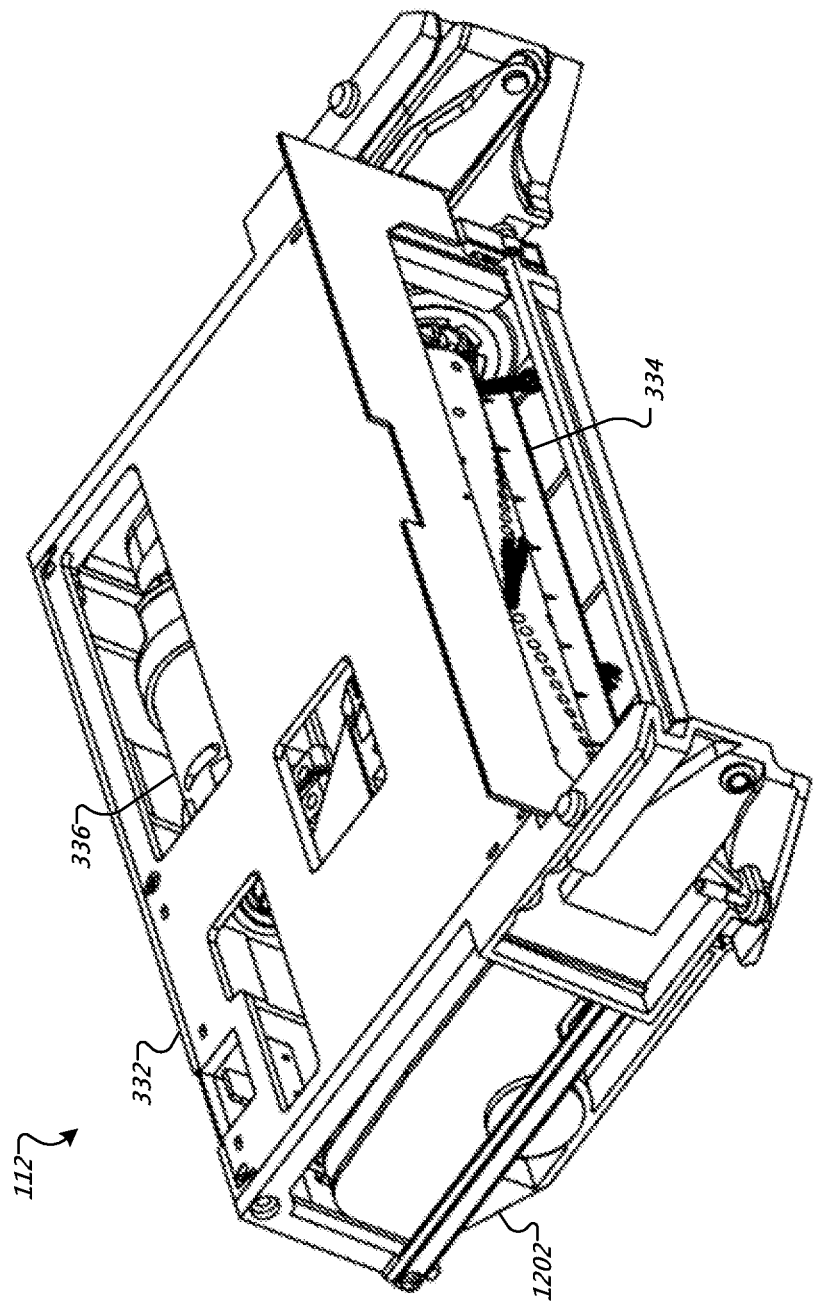
FIG. 12 is a perspective view showing an example of a cleaning assembly.

FIG. 12 is a perspective view showing an example of the cleaning module 112 (or coverage or work module, for implementations that do not "clean". Within the cleaning module 112, the cleaning module housing 332 carries a cleaning head assembly 1202. The cleaning head assembly 1202 may be movable with respect to the cleaning assembly housing 332 and the coverage robot 100. The cleaning head assembly 1202 carries the main cleaning brush 334 and the cleaning drive motor 336 (as can be seen, although a multiplicity of bristle groups are provided on the brush 334, only a few are depicted for clarity).

Figure 13:
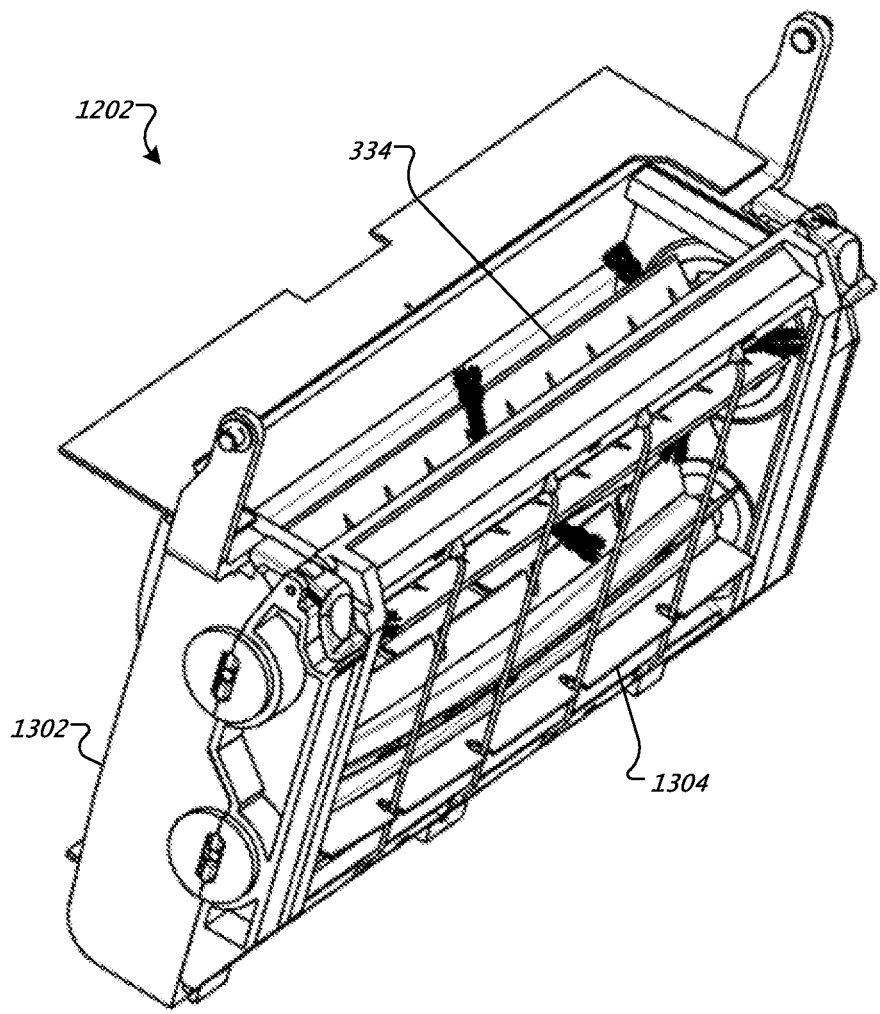
FIG. 13 is a bottom perspective view showing an example of a cleaning head assembly.

FIG. 13 is a bottom perspective view showing an example of the cleaning head assembly 1202. The cleaning head assembly 1202 includes a cleaning head assembly housing 1302. The cleaning head assembly housing 1302 carries the main cleaning brush 334 and a secondary cleaning brush 1304.

The main cleaning brush 1304 is rotatably coupled to the cleaning head assembly housing 1302. The secondary cleaning brush 1304 includes flexible flaps. The secondary brush 1304 rotates in the opposite direction to the main brush 1302, so that debris impelled by the main brush 1304 is caught and directed up and over the secondary brush. In addition, the flexible flaps may brush the work surface clean as the cleaning head 1304 rotates.

Figure 14:
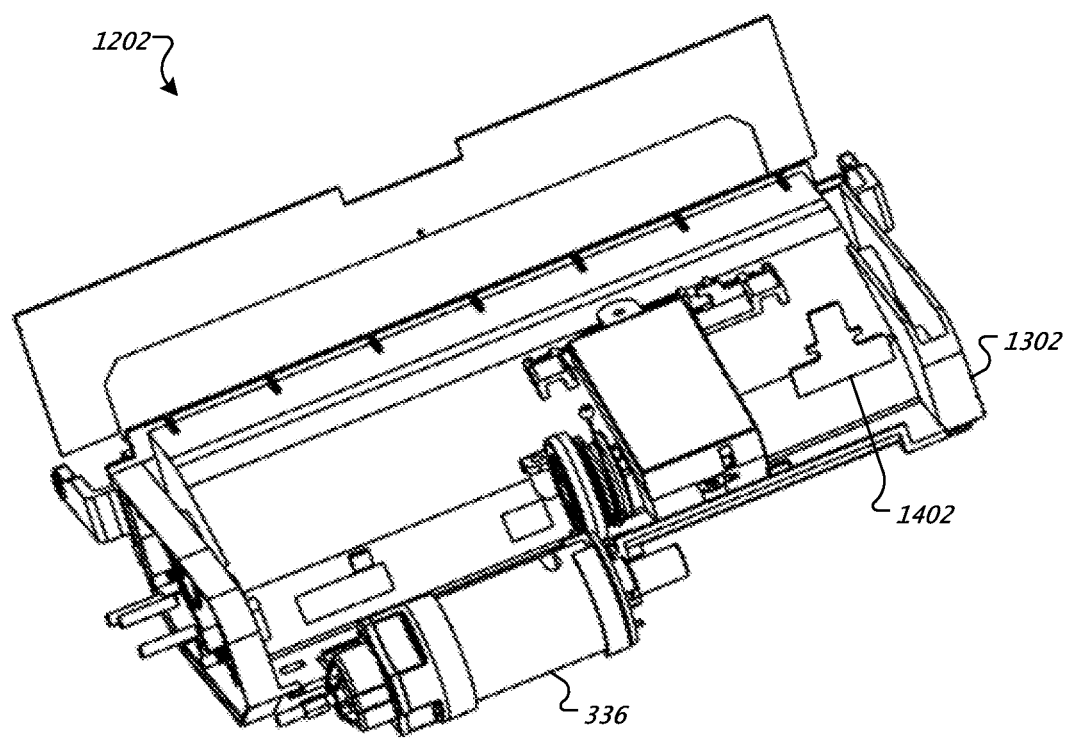
FIG. 14 is a top perspective view showing an example of a cleaning head assembly.

FIG. 14 is a top perspective view showing an example of the cleaning head assembly 1202. The view shows the location of the cleaning drive motor 336 at the back of the cleaning head assembly housing 1302. Referring to FIGS. 14 and 1C, the cleaning head assembly housing 1302 also includes a power connector 1402. The power connector 1402 provides power to the cleaning drive motor 336 from the electric battery 302. The power connector 1402 protrudes through an opening in the cleaning assembly housing 332 when the cleaning head assembly 1202 is placed in the cleaning assembly 112. Similar to the wheel module, the power connector 1402 on the drive wheel assembly 110a is a floating connector (edge card) mounted to the module housing with pins, having a clearance between the pins and a C-shaped receiving slot in the edge card, as well as surrounding the power connector 1402. When the cleaning assembly 112 is placed in the receptacle 308, the power connector 1402 mates with a power connector 208 in the chassis 202 to provide power to the cleaning drive motor 336. Mechanical hard points 1403 on the cleaning assembly 112 mate with corresponding mechanical hard points 209 in the receptacle 308.

In one implementation, referring to FIGS. 1C-D, the power connectors 1002, 1102, 1402, and 410 are tool-less (operable without tools) module-side electrical plugs that mate with corresponding tool-less module-side electrical plugs 204, 206, 208, and 210 on the chassis 202. The power connectors 1002, 1102, 1402, 410 204, 206, 208, and 210 establish an electrical connection between each module (the drive wheel assembly 110a, the drive wheel assembly 110b, the cleaning assembly 112, the cleaning assembly 102, the electric battery 302, and the cleaning bin 116) and a corresponding receptacle 304, 306, 308, 310, 312, and 316, respectively, upon insertion of the module into the receptacle.

Referring to FIGS. 1C-D, chassis 202 defines receptacle 250 in which controller board 1050 is removably mounted. Power connectors 204, 206, 208, and 210 in receptacles 304, 306, 308, and 310 respectively, are electricity connected to the controller board 1050. A display panel 105 is disposed above the chassis 202. The display panel 105 is in electrical communication with the controller board 1050.

Figure 15:
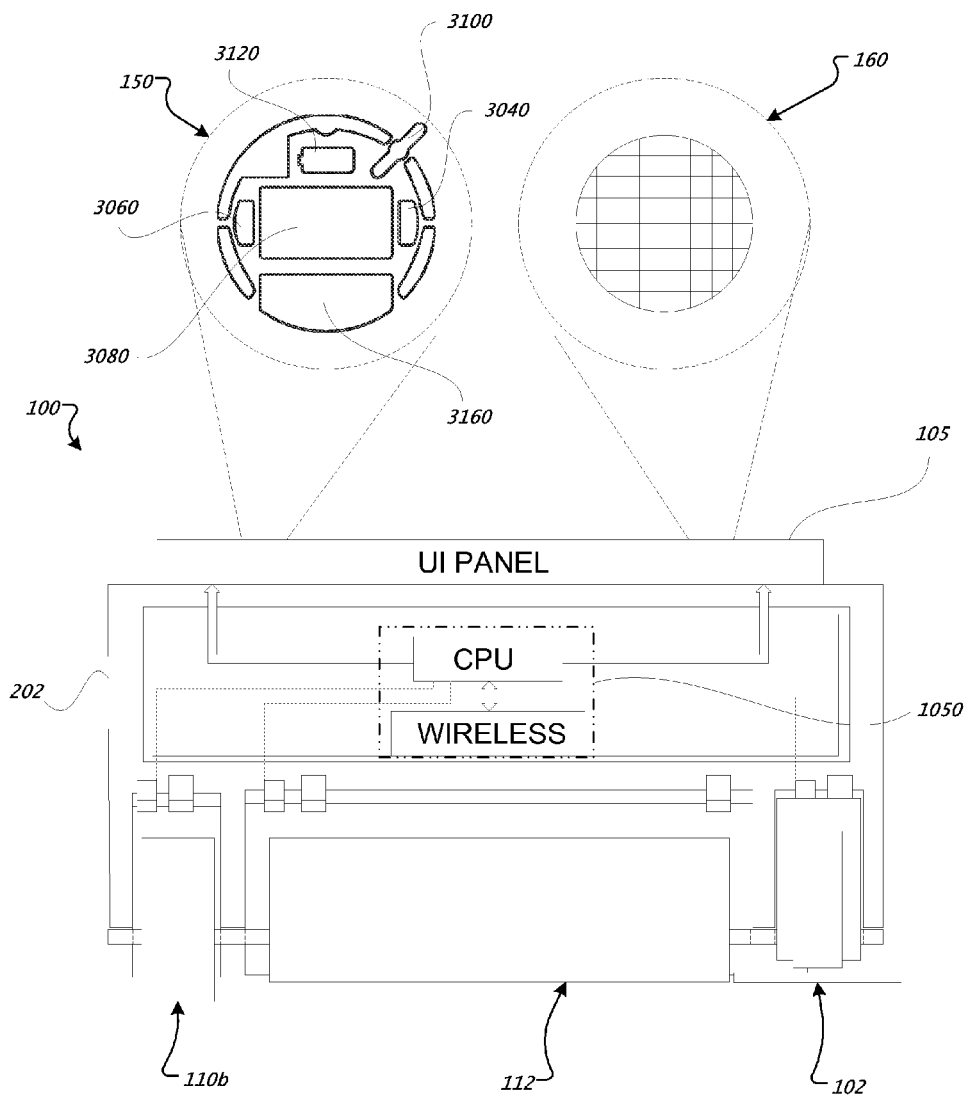
FIG. 15 is a schematic view showing an example of a coverage robot.

FIG. 15 is a schematic view showing an example of a robot 100 including a display panel 105 having indicia 150 and an audio output device 160. The indicia 150 comprises a segmented maintenance display substantially mimicking the appearance of the robot with illuminable indicia 3040, 3060, 3080, 3100, 3120, and 3160 corresponding to each module receptacle 304, 306, 308, 310, 312, and 316, respectively. Module receptacles 304, 306, 308, 310, 312, and 316 correspond to the drive wheel assembly 110a, the drive wheel assembly 110b, the cleaning assembly 112, the cleaning assembly 102, the electric battery 302, and the cleaning bin 116, respectively. The controller board 1050 controls the illumination of indicia 3040, 3060, 3080, 3100, 3120, and 3160 and the audio responses from the audio output device 160 of the display panel 105 to communicate service needs to a user. In one example, the controller illuminates one or more of the indicia 304, 306, 308, 310, 312, and 316 on the segmented maintenance display panel 105 to indicate that a module in one of the receptacles 304, 306, 308, 310, 312, and 316 needs to be removed and replaced by a user.

The controller board 1050 monitors the currents delivered to the drive wheel assemblies 110a-b and the cleaning head assemblies 102 and 112. Upon detecting an over-current, the appropriate indicia 3040, 3060, 3080, and 3100 of the maintenance display 150 is illuminated by the controller board 1050 to indicate a jam or other obstruction to be cleared. In another example, the controller board 1050 sends an audio response which is delivered by the audio output device 160 to provide instructions on how to correct a problem. Once the jam or problem is cleared, a warning/maintenance display will remain illuminated if the over-current remains, indicating that replacement of the module is required. In one implementation, the cleaning bin 116 includes a bin full sensor that communicates a current bin capacity to the controller board 1050. When the controller board 1050 detects that the bin is full it illuminates indicia 3160 to signal to a user to empty the cleaning bin 116. When the controller board 1050 detects that the battery 302 is low or in need of service it illuminates indicia 3120 to signal to a user to maintenance the battery 302. In each example, the controller board 1050 may have guided audio instructions delivered by the audio output device 160. (E.g., remove the cover, remove the module, send it in or discard it, and order a new one.) Different colors (e.g., multi-colored LEDs or different LEDs) may be provided for each segment, in order to communicate different messages— e.g., green for no attention needed, yellow for jam, red for service or maintenance replacement, flashing green for ordinary care such as bin emptying, cleaning fluid replacement, or battery charging).

Figure 16:
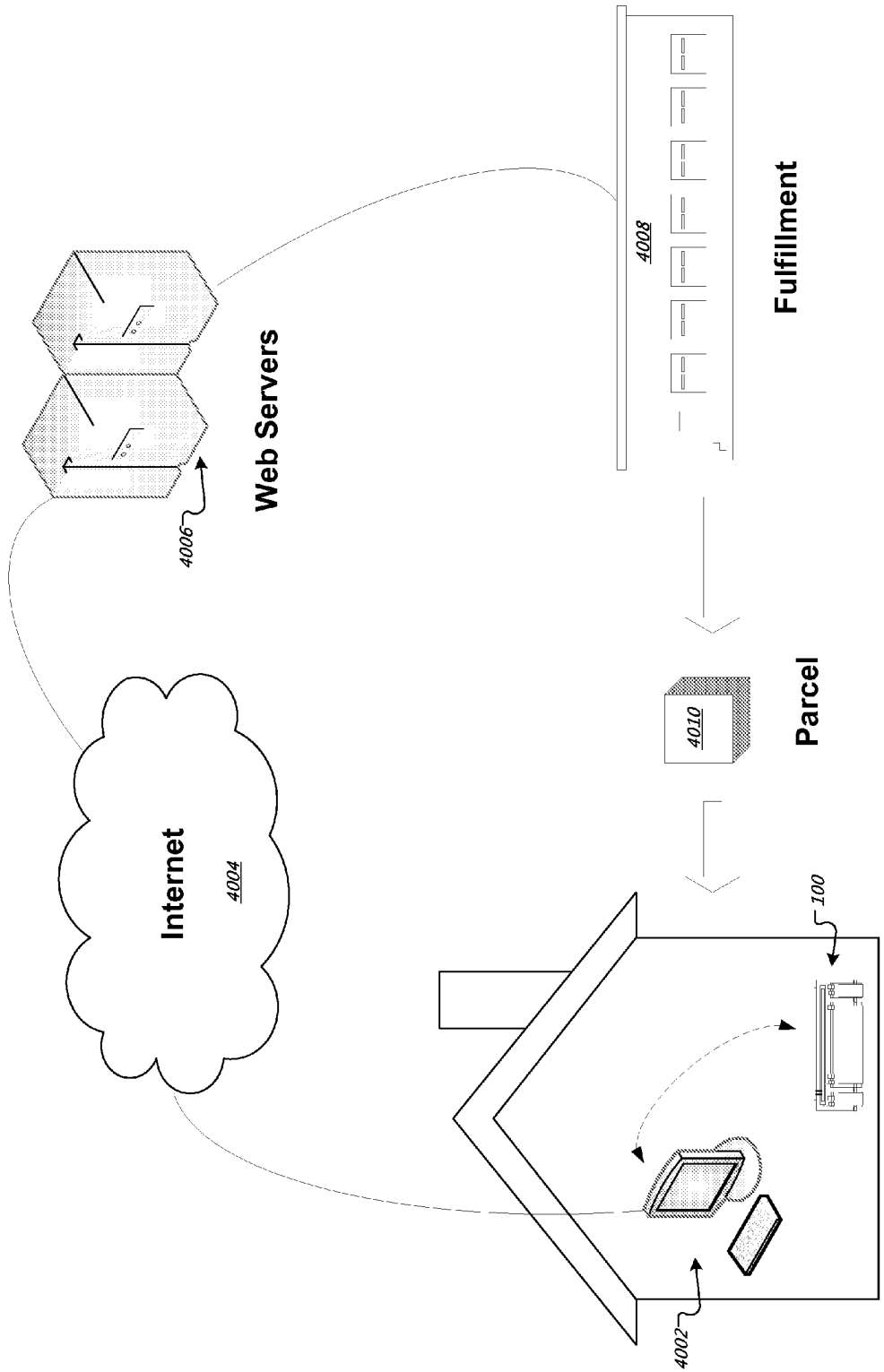
FIG. 16 is a schematic view showing an example of a coverage robot servicing process.

Referring to FIG. 16, modularity is used to extend robot life. In one implementation, a user responds to illumination of the illuminable indicia 3040, 3060, 3080, 3100, 3120, and 3160 on the maintenance display 105 corresponding to one or more modules or to instructions provided from the audio output device 160 to identify a module to be replaced. The user communicates a maintenance request through a computer 4002 over an internet 4004 to a web server 4006 which routes the maintenance request to a fulfillment center 4008. The fulfillment center 4008 sends a replacement part parcel 4010 to the user. The robot 100 can provide audio instructions on how to install the part. In another implementation, the robot 100 communicates wirelessly to a local network 4002, which communicates the maintenance request.

Figure 17:
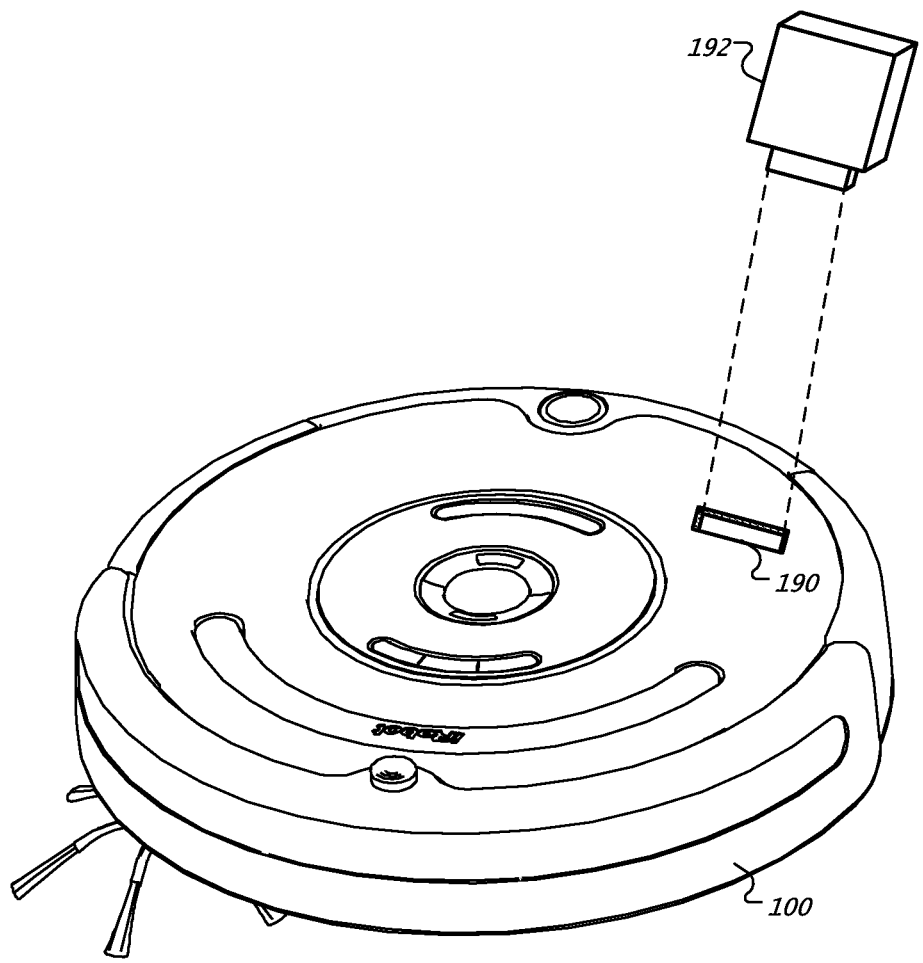
FIG. 17 is a top perspective view showing an example of a coverage robot.

Referring to FIG. 17, the modularity of the robot 100 can be further extended by a module slot 190 defined in an upper portion of the robot 100. The modular slot 190 is configured to accept a data module 192. The data module 192 is self-contained and can transport data on constituent RAM, ROM, Flash, or EEPROM type storage devices (which might be loaded with software, video, or audio content either at a user's computer equipped with a special writing unit or at the manufacturer in order to provide content such as themed content, for example).

In one example, the data module 192 is a recording device installable in the module slot 190 for recording a mileage of the robot 100 and its constituent parts. For example, the data module 192 can record a distance driven, how often the robot 100 has been used, the life of certain modules, when modules have been changed, etc. Furthermore, the robot can be configured to not function without the data module 192 installed. In yet another example, the data module 192 is used to change software behaviors of the robot 100. The cover 106 may form the body of the data module 192, e.g., with additional sensors (e.g., sonar pointing forward, IR emitters/receivers in multiple directions, IR receivers pointing toward compass point directions, IR projectors pointing at the ceiling, IR receivers pointing at the ceiling, gyroscope(s) arranged to detect and/or yaw), actuators (e.g., pan/tilt unit, spray unit), communication (RF or IR line of sight) or microprocessors.

"ROBOT OBSTACLE DETECTION SYSTEM", U.S. Pat. No. 6,594,844, disclosing proximity sensors such as cliff sensors and wall following sensors; "AUTONOMOUS FLOOR-CLEANING ROBOT", U.S. Pat. No. 6,883,201, disclosing a general structure of an iRobot Roomba coverage/cleaning robot and main and edge cleaning heads in detail; "METHOD AND SYSTEM FOR MULTI-MODE COVERAGE FOR AN AUTONOMOUS ROBOT", U.S. Pat. No. 6,809,490, disclosing motion control and coverage behaviors, including escape behaviors, selected by an arbiter according to the principles of behavior based robotics; and "METHOD AND SYSTEM FOR ROBOT LOCALIZATION AND CONFINEMENT", U.S. Pat. No. 6,781,338, disclosing virtual walls, i.e., robot confinement using wall-simulating directed beams, are each incorporated by reference herein in their entireties.

Other robot details and features combinable with those described herein may be found in the following U.S. patent applications filed Dec. 4, 2006, entitled "AUTONOMOUS COVERAGE ROBOT NAVIGATION SYSTEM" having assigned Ser. No. 11/633,869; "COVERAGE ROBOT MOBILITY" having assigned Ser. No. 11/633,885; and "ROBOT SYSTEM" having assigned Ser. No. 11/633,883, the entire contents of which are hereby incorporated by reference.

A number of implementations have been described. Nevertheless, it will be understood that various modifications may be made without departing from the spirit and scope of the following claims. For example, the coverage robot may include a different number of drive wheel assemblies or cleaning assemblies than those described above. Accordingly, other implementations are within the scope of the following claims.

What is claimed is:

1. A coverage robot comprising:
   a chassis defining one or more module-receiving receptacles;
   a plurality of mating connectors, each mating connector disposed in a respective module-receiving receptacle;
   a top cover carried on the chassis, the cover and the chassis defining at least a portion of an enclosed volume;
   an electronic controller disposed in the enclosed volume and in electrical communication with each of the plurality of mating connectors, the enclosed volume isolating the enclosed electronic controller from the one or more module-receiving receptacles;
   multiple drive wheel assemblies configured to maneuver the robot over a surface, each drive wheel assembly comprising a power connector, a drive wheel assembly housing, and a wheel rotatably coupled to the drive wheel assembly housing, the drive wheel assemblies each separately and independently slidable along a respective module-receiving receptacle to electrically connect the respective power connectors to the respective mating connectors.

2. The coverage robot of claim 1, wherein each drive wheel assembly further comprises a wheel drive motor carried by the respective drive wheel assembly housing and operable to drive the respective wheel of the drive wheel assembly.

3. The coverage robot of claim 1, wherein each module-receiving receptacle defines a downward facing opening disposed toward the bottom of the robot.

4. The coverage robot of claim 3, wherein each drive wheel assembly is slidable along a respective module-receiving receptacle, in a direction substantially perpendicular to the opening disposed toward the bottom of the robot.

5. The coverage robot of claim 3, further comprising a removable cover secured to a bottom of the chassis, the cover securing each wheel assembly within a respective module-receiving receptacle.

6. The coverage robot of claim 5, wherein the removable cover defines a plurality of openings smaller than the respective downward facing openings of the module-receiving receptacles.

7. The coverage robot of claim 1, wherein each drive wheel assembly further comprises a sensor, the drive wheel assemblies each separately and independently slidable along the respective module-receiving receptacle to establish electrical communication between the sensor and the controller.

8. The coverage robot of claim 7, wherein the sensor is a wheel-surface proximity sensor configured to detect the proximity of the chassis to the surface over which the robot is maneuverable.

9. The coverage robot of claim 8, wherein the wheel-floor proximity sensor comprises an infrared emitter and detector pair, the infrared emitter arranged to emit an infrared signal toward the surface and the infrared detector arranged to detect the reflection of the emitted infrared signal off of the surface.

10. The coverage robot of claim 1, wherein the controller is configured to monitor current delivered to each electrically connected drive wheel assembly and configured illuminate a display upon detecting an overcurrent condition.

11. The coverage robot of claim 1, wherein each of the module-receiving receptacles comprises a plurality of parallel guide walls along which a respective one of the drive wheel assemblies is slidable to electrically connect a respective power connector to a respective mating connector.

12. The coverage robot of claim 11, wherein each module-receiving receptacle further comprises an end wall substantially parallel to the plurality of guide walls, the respective mating connector disposed along the end wall.

13. The coverage robot of claim 1, wherein each module receiving receptacle is disposed toward a periphery of the robot and the plurality of module receiving receptacles are axially aligned with one another.

14. The coverage robot of claim 1, further comprising a display panel in electrical communication with the controller, the display panel comprising indicia illuminable to indicate that one of the multiple drive wheel assemblies in one of the respective module-receiving receptacles is to be removed and replaced.

15. The coverage robot of claim 1, wherein the power connector of each drive wheel assembly is disposed on an outer portion of each respective drive wheel assembly housing.

16. The coverage robot of claim 1, further comprising fasteners movable in the direction of insertion of a respective drive wheel assembly to secure the drive wheel assembly in a respective module-receiving receptacle.

* * * * *